US009684922B2

(12) United States Patent
Elberbaum

(10) Patent No.: US 9,684,922 B2
(45) Date of Patent: *Jun. 20, 2017

(54) ACCURATE DELIVERY APPARATUS AND METHOD FOR DELIVERING FROM WITHIN A BUILDING AND DISTANT LOCATIONS

(71) Applicant: Elbex Video LTd., Tokyo (JP)

(72) Inventor: David Elberbaum, Tokyo (JP)

(73) Assignee: ELBEX VIDEO LTD., Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/492,417

(22) Filed: Sep. 22, 2014

(65) Prior Publication Data
US 2015/0012456 A1 Jan. 8, 2015

Related U.S. Application Data

(62) Division of application No. 13/916,822, filed on Jun. 13, 2013, now Pat. No. 9,514,490.

(51) Int. Cl.
*G06Q 30/00* (2012.01)
*G06Q 30/06* (2012.01)
(Continued)

(52) U.S. Cl.
CPC ......... *G06Q 30/0633* (2013.01); *G06Q 10/08* (2013.01); *G06Q 10/083* (2013.01);
(Continued)

(58) Field of Classification Search
CPC .................................. G06Q 30/0601–30/0645
(Continued)

(56) References Cited

U.S. PATENT DOCUMENTS 5,661,517 A 8/1997 Budow
5,923,363 A 7/1999 Elberbaum
(Continued)

FOREIGN PATENT DOCUMENTS

EP 1280355 1/2003
EP 1605700 12/2005
(Continued)

OTHER PUBLICATIONS

Hartley, T. (1993). Interactive TV lets you bring home the bacon—or the pizza.Business First, 9(17), 1. Retrieved from https://search.proquest.com/docview/231027793?accountid=14753.*
(Continued)

*Primary Examiner* — Resha Desai
(74) *Attorney, Agent, or Firm* — Katten Muchin Rosenman LLP

(57) ABSTRACT

A delivery station and a method for operating the delivery station including a station server, at least one of storage device for controlling storage facility and a delivery device for delivery including confirmation, located in one of a building and distant and connected to at least one e-provider server via a network for gathering and delivering without error at least one of merchandise and service item included in an order received by at least one e-provider from at least one dweller of the building, each of the devices comprising a CPU, a memory, indicators and touch display screen identifying particulars pertaining to a stored item, the order received from a dweller, a barcode reader, an RFID reader, a communication transceiver for verifying and communicating the gathering and the delivery, including updating of the stored item quantity via the station server upon execution or cancellation of the delivery.

22 Claims, 15 Drawing Sheets

(51) Int. Cl.
*G06Q 10/08* (2012.01)
*H02J 7/00* (2006.01)
*H04L 5/14* (2006.01)
*H04L 29/06* (2006.01)

(52) U.S. Cl.
CPC ....... *G06Q 10/087* (2013.01); *G06Q 30/0601* (2013.01); *G06Q 30/0635* (2013.01); *G06Q 30/0641* (2013.01); *H02J 7/0052* (2013.01); *H04L 5/14* (2013.01); *H04L 65/60* (2013.01); *H02J 7/007* (2013.01)

(58) Field of Classification Search
USPC .............. 705/26.1–27.2; 381/300; 348/14.07
See application file for complete search history.

(56) References Cited

U.S. PATENT DOCUMENTS

| | | | |
|---|---|---|---|
| 5,970,473 | A | 10/1999 | Gerszberg |
| 6,603,842 | B2 | 8/2003 | Elberbaum |
| 6,940,957 | B2 | 9/2005 | Elberbaum |
| 7,461,012 | B2 | 12/2008 | Elberbaum |
| 8,117,076 | B2 | 2/2012 | Elberbaum |
| 8,131,386 | B2* | 3/2012 | Elberbaum .......... H04M 11/025 381/22 |
| 8,489,469 | B1 | 7/2013 | Elberbaum |
| 2001/0018671 | A1* | 8/2001 | Ogasawara .......... G06Q 10/087 705/26.8 |
| 2009/0106085 | A1* | 4/2009 | Raimbeault ...................... 705/10 |
| 2009/0106122 | A1* | 4/2009 | Elberbaum ..................... 705/26 |
| 2009/0141117 | A1* | 6/2009 | Elberbaum ............. H04N 7/186 348/14.04 |
| 2009/0187436 | A1* | 7/2009 | Shoen et al. ....................... 705/5 |
| 2010/0316237 | A1 | 12/2010 | Elberbaum |
| 2013/0151379 | A1* | 6/2013 | Edwards .................... 705/26.81 |
| 2013/0263008 | A1* | 10/2013 | Bylahalli et al. ............. 715/739 |

FOREIGN PATENT DOCUMENTS

| | | |
|---|---|---|
| JP | 2001-253511 | 9/2001 |
| JP | 2002-057804 | 2/2002 |
| JP | 2004-240626 | 8/2004 |
| JP | 2012-094001 | 5/2012 |

OTHER PUBLICATIONS

U.S. Office Action dated Jan. 10, 2014 for corresponding U.S. Appl. No. 13/916,822.
U.S. Office Action dated Jun. 13, 2014 for corresponding U.S. Appl. No. 13/916,822.
U.S. Office Action dated Feb. 28, 2014 for corresponding U.S. Appl. No. 13/916,822.
U.S. Office Action dated Jan. 14, 2015 from corresponding U.S. Appl. No. 14/492,481.
U.S. Office Action dated Jan. 20, 2015 from corresponding U.S. Appl. No. 14/492,549.
International Search Report and Written Opinion dated Oct. 16, 2014 from corresponding Application No. PCT/US2014/041285.
U.S. Office Action dated Jan. 6, 2015 from corresponding U.S. Appl. No. 14/476,139.
U.S. Office Action dated Dec. 9, 2014 from corresponding U.S. Appl. No. 13/916,822.
U.S. Office Action dated Mar. 23, 2015 from corresponding U.S. Appl. No. 13/916,822.
U.S. Office Action dated Mar. 17, 2015 from corresponding U.S. Appl. No. 14/476,139.
U.S. Office Action dated Apr. 6, 2015 from corresponding U.S. Appl. No. 14/492,481.
U.S. Office Action dated Apr. 17, 2015 from corresponding U.S. Appl. No. 14/492,549.
U.S. Office Action dated Dec. 15, 2015 from corresponding U.S. Appl. No. 13/916,822.
U.S. Office Action dated Jan. 29, 2016 from corresponding U.S. Appl. No. 14/476,139.
U.S. Office Action dated Mar. 11, 2016 from corresponding U.S. Appl. No. 14/492,481.
U.S. Office Action dated Apr. 14, 2016 from corresponding U.S. Appl. No. 14/492,549.
U.S. Office Action dated Apr. 4, 2016 from corresponding U.S. Appl. No. 14/505,792.
U.S. Office Action dated Oct. 5, 2016 from corresponding U.S. Appl. No. 14/492,481.
U.S. Notice of Allowance with references dated Oct. 5, 2016 from corresponding U.S. Appl. No. 13/916,822.
U.S. Office Action dated Aug. 9, 2016 from corresponding U.S. Appl. No. 14/476,139.
U.S. Office Action dated Oct. 1, 2015 from corresponding U.S. Appl. No. 14/492,549.
U.S. Office Action dated Jul. 14, 2015 from corresponding U.S. Appl. No. 13/916,822.
U.S. Office Action dated Aug. 11, 2015 from corresponding U.S. Appl. No. 14/476,139.
U.S. Office Action dated Aug. 20, 2015 from corresponding U.S. Appl. No. 14/492,481.
Written Opinion from the Intellectual Property Office in Singapore dated Jun. 20, 2016 from corresponding Application No. 11201509960P.
U.S. Office Action dated Jun. 23, 2016 from corresponding U.S. Appl. No. 13/916,822.
U.S. Office Action dated Jul. 7, 2016 from corresponding U.S. Appl. No. 14/505,792.
U.S. Office Action dated Mar. 2, 2017 from corresponding U.S. Appl. No. 14/476,139.
Mexico Office Action dated Feb. 10, 2017, from the corresponding Mexico Application No. MX/A/2015/017165.
Supplemental European Search Report dated Jan. 5, 2017, from the corresponding European Application No. 14811237.8.
Canada Office Action dated Dec. 20, 2017, from the corresponding Canada Application No. 2,913,475.
U.S. Office Action dated Nov. 23, 2016 from corresponding U.S. Appl. No. 14/492,549.
U.S. Office Action dated Dec. 1, 2016 from corresponding U.S. Appl. No. 14/505,792.
Australian Examination Report dated Oct. 5, 2016 from corresponding Australian Application No. 2014278526.
Supplemental European Search Report dated Dec. 12, 2016 from the corresponding European Application No. 14811237.8.

* cited by examiner

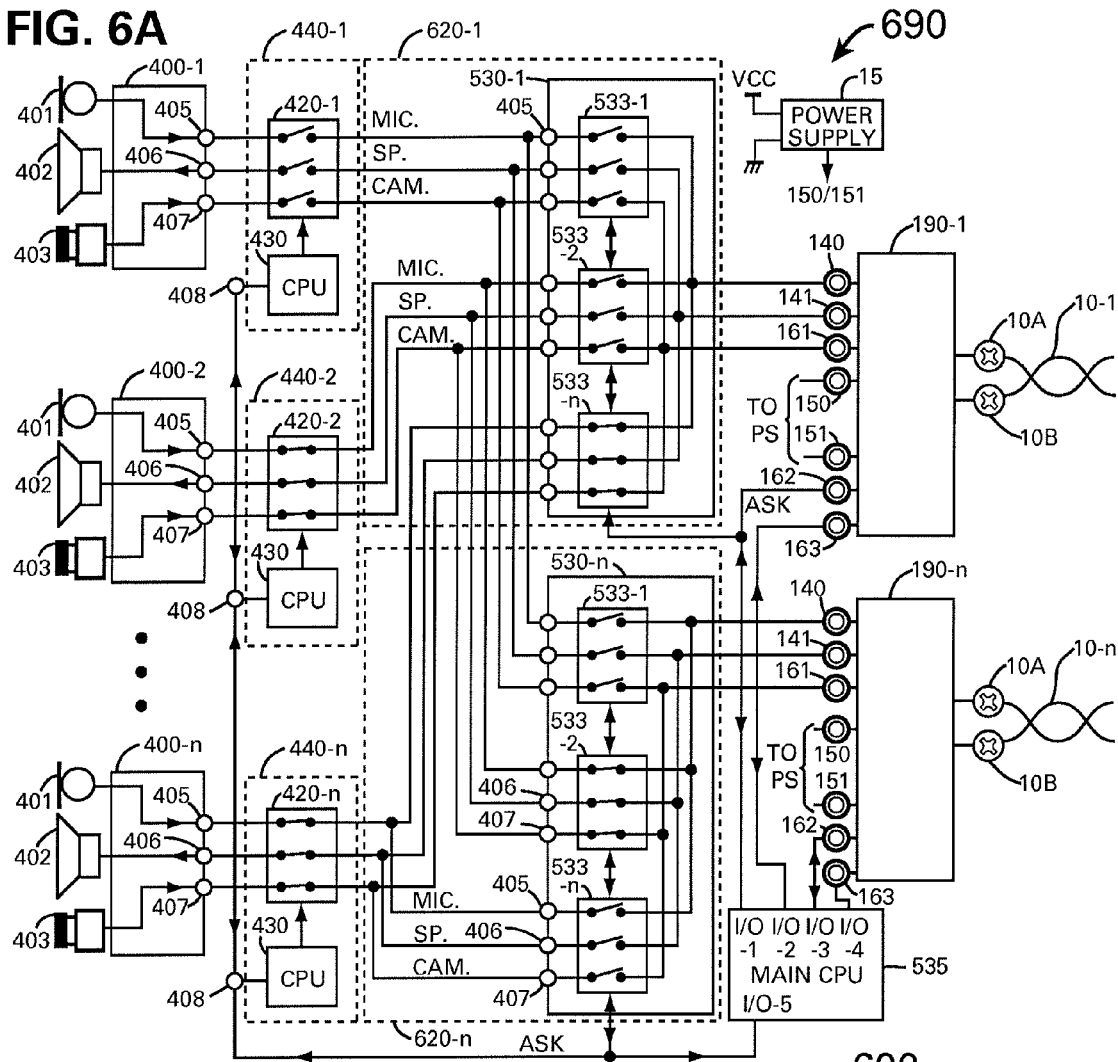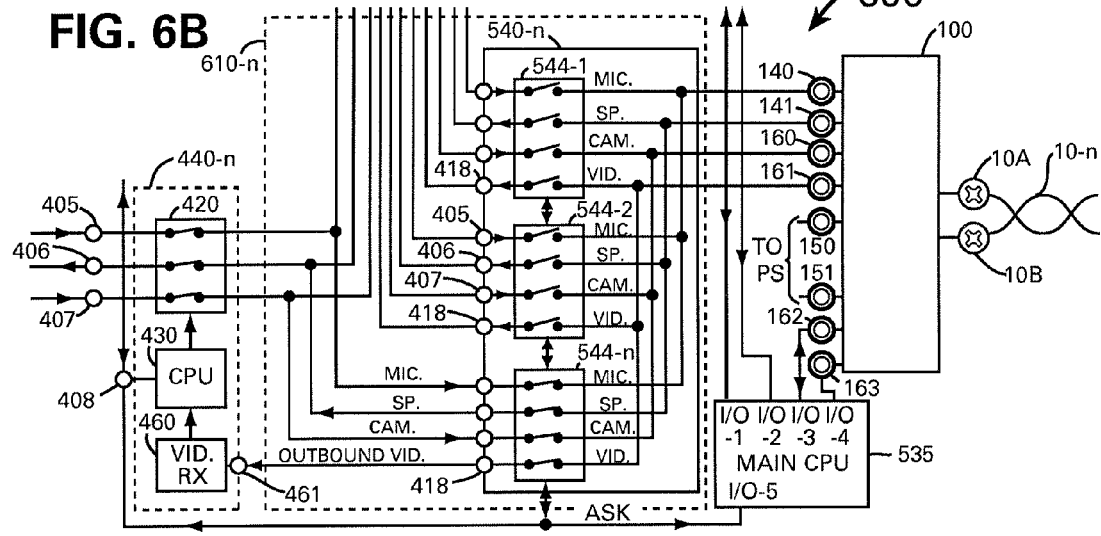

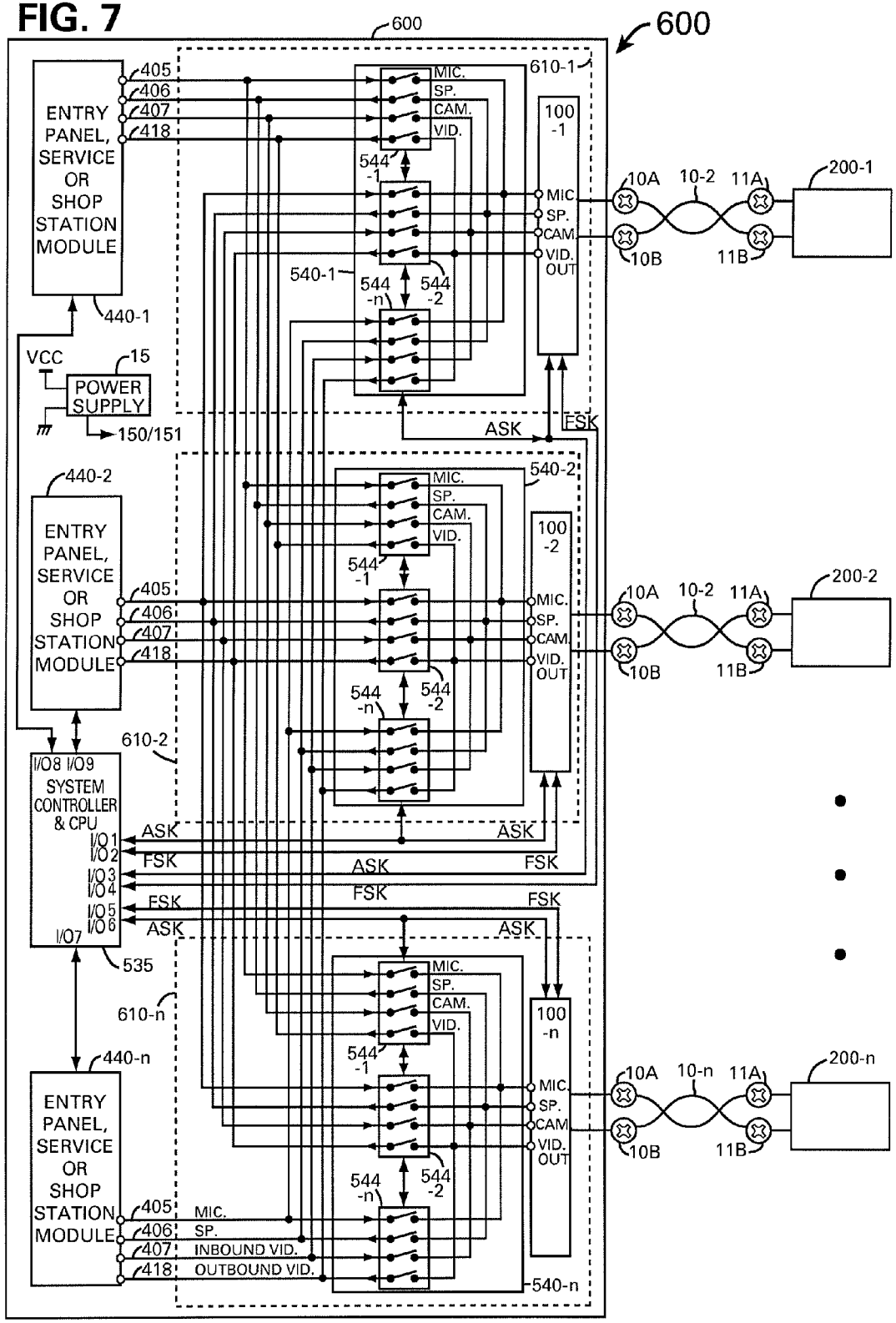

FIG. 13
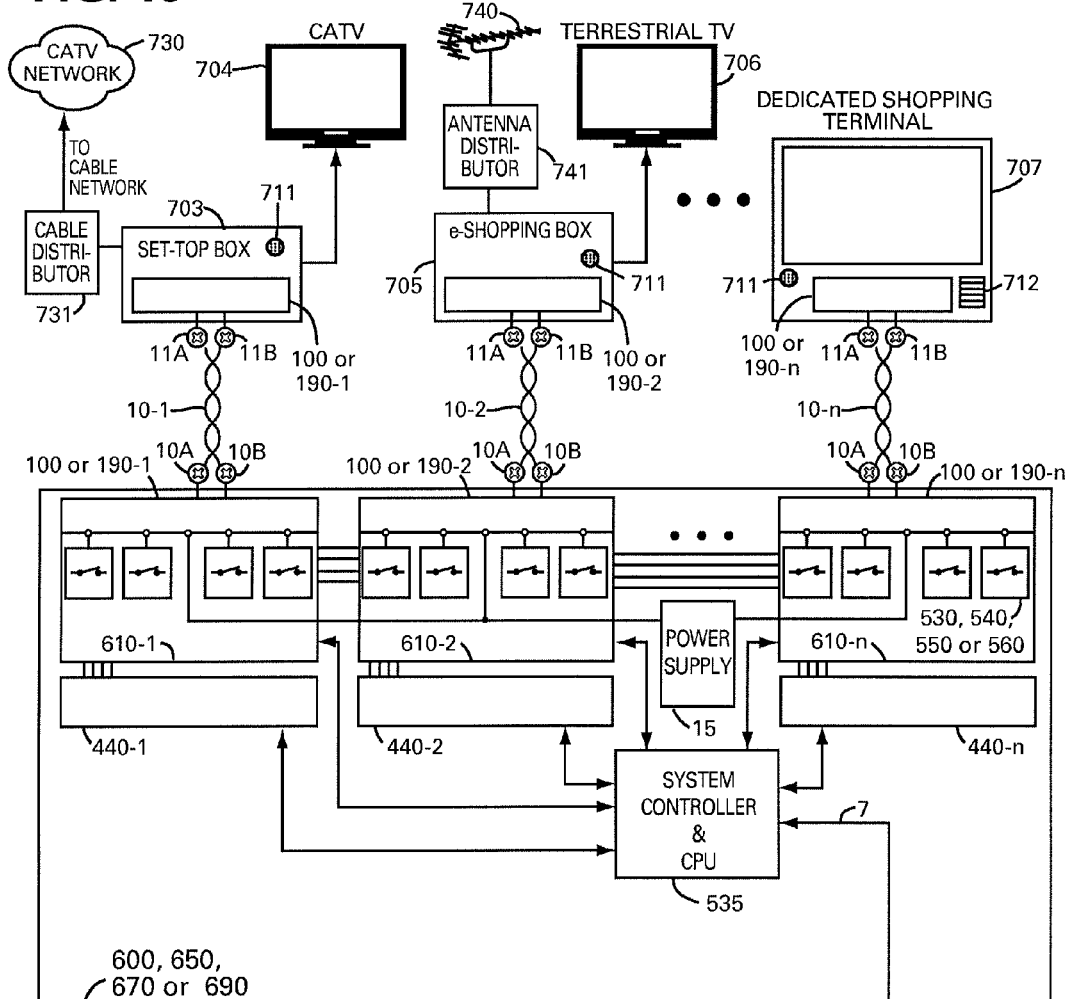
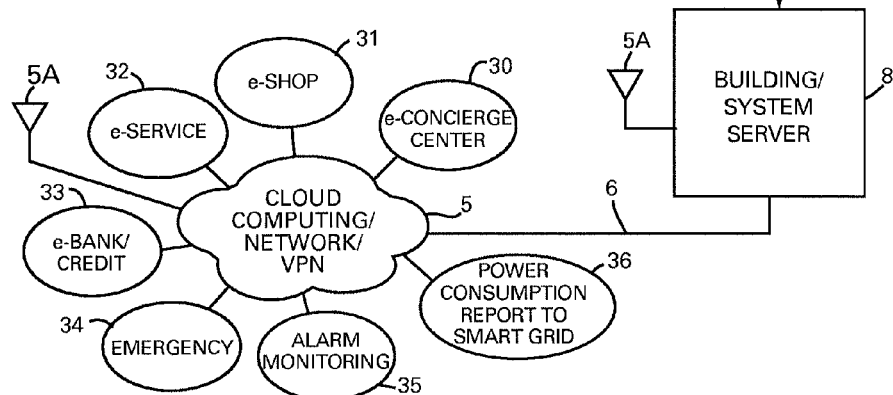

ACCURATE DELIVERY APPARATUS AND METHOD FOR DELIVERING FROM WITHIN A BUILDING AND DISTANT LOCATIONS

FIELD OF INVENTION

The present invention relates to the propagation of combination of analog and digital signals via a single twisted pair carrying DC power to appliances such as a dedicated shopping terminal, a video interphone monitor, a set top box and a cable television including an e-shopping circuit and programs.

BACKGROUND OF THE INVENTION

The current or the prevailing e-commerce is operated in a given pattern and processes enabling buyers to search for a supplier through a known search engine, select a known or an unknown website that appears to be a presentation corresponding to the intended shopping, be it for services or merchandise.

Once a potential buyer identifies a web of an e-shop and did find the items of interest, he has to go into next process of identifying himself, his address and his credit card, before he can materialize a purchase.

This process is a frustrating process that does not fit a repeat daily or weekly shopping for immediate deliveries of for example grocery products.

For people needing an immediate deliveries the common process described above cannot offer a solution if one needs in a morning a milk for breakfast, such ordering will take too long to be processed and delivered, even if the e-shop is a convenient store located nearby the residence of the e-buyer and does provide for local deliveries.

To help improve the process such nearby shops that provide deliveries may store the details of repeated neighborhood buyers and the buyers will introduce the shop's URL icon onto their PC's desk top, for an immediate recall of the shop's website. In turn the shop will provide the buyer with an access password, identifying the buyer and his credit card as recorded in the shop server. Such setup makes the ordering process faster and simpler.

Similar recording and storing of customer's data are offered by large shops, supermarkets, and department stores for improving the process of e-shopping to a repeat buyers. Such handling improves upon the e-shopping processes but that does not provide the basics needed to transform the grocery shopping and deliveries for example, into an efficient process.

The e-shopping first hurdle is that in all the above described e-shopping processes and setups the buyer has to surf the shop website by selecting products or services through pages displayed onto his PC, smart phone or iPad screen, fed from the shop server via the Internet or other IP networks, for selecting his choices through the shop's server.

Each such shop server has its own architecture, colors, styles, operating systems, programming and processing method that the e-buyers have to learn and follow. Thus even though the e-buyer detailed data is stored in the e-shop server, the proprietary programming and the different shopping processes for each individual e-shop extends the time spent to shop via a given e-shop server.

Further when the whole shopping cannot be supplied by a single shop and must be divided into two or more separate e-shops or e-service providers, such e-shopping calls for a very attentive and time consuming e-shopping process. Thus a combined shopping for groceries, such as extending the milk example given above, to shop for milk and cereals from two separate e-shops is a complex operation. Ordering two items from two different convenient stores in the morning for a breakfast will take too long time to order and deliver, while the buyer wants and expects the delivery promptly.

Other methods and apparatuses for e-shopping for services and merchandise merged into a closed circuit shopping systems operating in a registered closed circuit are disclosed in U.S. Pat. Nos. 6,603,842, 6,940,957, 7,461,012, 8,117,076 and in many corresponding patents issued and pending in other countries. Method and structure for simplified e-shopping coding is disclosed in U.S. application Ser. No. 13/599,275.

The disclosed closed circuit e-shopping is provided via shopping terminals such as a video interphone monitor of a video interphone system and via shopping circuits of a cable TV system, an antenna TV system and a dedicated e-shopping terminal system. The referenced application Ser. No. 13/599,275 covers the coding for the e-shopping signals processed by the shopping circuits referred to above.

The basic or the fundamental difference between the two e-commerce methods, i.e., the prevailing e-shopping and the closed circuit e-shopping system, disclosed in the above referenced US patents is:

i. the prevailing e-shoppings are processed and completed through the shop's server, on line.

ii. The closed circuit e-shoppings are processed and completed through the shopping terminal on its own, off line.

This is made possible by the installing a pre-designed and pre-configured shopping programs and content, selected from a group of registered e-shops, and by loading and storing such programs and content into the memory of the e-shopping circuits of the e-shopping terminal. The stored content covers pre-configured or pre-selected products, as selected by a dweller, for a recall from a memory of one of the dedicated shopping terminals or from the memory of one of the TVs referred to above or from the memory of the video interphone monitors.

Thereby, the close circuit shopping is fundamentally different from the prevailing shopping by providing an instant recall of stored data, patterned through a template into a standard shopping select display. This enables an instant habitual shopping, through a habitually recognized pattern for selection of products and services.

The display of categories, groups and shops are all patterned via identical templates that are individually assembled and installed into the shopping circuit memory of each individual residence, on the basis of shops, categories and groups selected by each dweller. The dweller decides and selects the categories or group of product and/or services and from which shops he will buy from. The selected shops, categories and groups will be loaded and stored into the memory of the individual shopping terminal. All others are excluded but can be installed into the memory at later date, if the dweller changes his mind.

The closed circuit shopping apparatuses of the present invention are selected from a group comprising video interphone monitors, dedicated shopping terminals, TV, cable TV and/or TV and cable TV accessories such as set top box, shopping box, adaptor box, cable TV box, antenna box, converter box and/or a server that serves the whole building or the whole neighborhood via a local network and/or via the internal communication lines, TV cable lines or TV antenna lines.

The shopping terminals of the closed circuit shopping include the hardware and programs, pre-installed with a pre-defined shopping programs and content, for enabling to select and order through the stored programs as selected by the dweller, with no time waste by surf and search via search engines and via variety of shop servers. Such pre-programmed close circuit shopping provides the infrastructure to initiate prompt deliveries as programmed.

The prompt deliveries are provided via delivery station or delivery terminals, disclosed in the reference application Ser. No. 13/599,275, to be inside the building or within the neighborhood.

The searches for e-services and e-merchandise are carried through the displays generated by the installed program pages, using the displays of a video interphone monitor, a dedicated shopping terminal, a TV or a cable TV to process the shopping.

The introduction of a complete shopping program and content into the shopping terminals transforms the shopping terminals into a self-assembled privately owned e-shopping mall inside each residence, office or business, or it can be a virtual neighborhood shopping mall of a whole building and/or the whole neighborhood, if so desired by the neighborhood.

Such closed circuit e-shopping for products and/or services mandates that all the shopping terminals of the system must be updated at all times with each and every product and service particulars.

The pages of the current prevailing shopping servers, the selecting icons, the offered items, their prices, the conditions and any other particulars of the shopping process and terms, including the availabilities of services or products are commonly designed and programmed by website design professionals, knowledgeable in the structuring of website pages.

Supermarkets, for example, offering fresh produce, such as green vegetable or dairy products will change daily or weekly their pages to accommodate varying prices and availability because of seasons, locations and transportation consideration etc. The changes are ongoing continuous to the given pages of the shop server or to a group of servers used by larger supermarkets or chains of shops.

Such professionally amended pages, prepared internally by a given shop or a chain, do not fit the need to add, amend or replace e-shopping pages of a vast spread shopping terminals in large number of residences or businesses in different locations and places.

It will be prohibitively costly to design specific pages for a given consumer or to a group of consumers, be it one or more residence buildings or other group of potential shoppers. It will take long to configure and design and will be very complex to download and/or update pages to all the residence's individual shopping terminals. It will be an enormous task to download and/or upgrade vast individual programs and pages tailored to the many individuals or group preferences, be it regularly or randomly.

The referenced U.S. application Ser. No. 13/599,275 teaches a simple to design, add, amend or replace pages or a portion of page, such as a price of a single product included in a page, or the removal of a product from a page when it is sold out. The updating process must be provided in an easy to learn, configure, operate and install concept and at a low cost.

Another existing problem for a closed circuit e-shopping by a large number of tenants of a large residential or office building is the security of the transaction and the prevention of cyber theft, particularly from within the environment of the closed circuit itself.

Yet, another problem is the reliability of the shopping network in a building that is based on routers and switches cascaded throughout the building floors, via an IP local LAN network such as Ethernet. Routers of large systems installed in communication or electrical cabinets of staircases and entrance halls of large buildings, or mounted in a communication boxes on poles and similar are accessible to cyber theft.

Further a failure of one such router or a switch, may cut a whole section of a building from the LAN or from a building server and cut many shopping terminals from the shopping process, or from the updating process through the day or night.

To overcome security and reliability potential risks it is preferable to network such large complexes in a star topology, directly to a central distributor or a matrix of the system, that is securely installed in a protected surrounding.

The problems with such star connections are the cabling and their limitation in distance and speed. Fiber optic cables can be one solution, but fiber optical cabling, connectors and terminals are expensive and require expertise. Twist pair via such cables known as CAT5 provide low cost solution and are well handled and installed by electricians, but are limited in length and speed.

A solution to use a twist pair or pairs to connect the shopping terminals in a star to a central distributor or matrix or a specific designed router or switch is needed. One such solution is disclosed in U.S. Pat. No. 5,923,363 and in the above other referenced U.S. patents and the U.S. application Ser. No. 13/599,275.

The important issue is of course the speed, that must be fast enough to update the many shopping terminals at random and periodically, propagated to distances such as up to 200 m (660 ft) or more. This is not achievable via a standard Ethernet IP wired network, using the commonly installed CAT5 cables.

There are many other instances in which high speed communications via a CAT5 and similar network cables need to be extended for propagating a combination of signals, such as analog audio and video including variety of digital signals, but the cable length limitations prevent the use of common wires, and mandates combination of cables, such as coax cables shielded wires and/or optical fiber cables, requiring different interfaces, adaptors and connectors, all of which are technically complex to configure and install, and moreover, are expensive and require highly skilled experts to install.

Solutions are needed to propagate two way information signals comprising audio, video, data, control, codes, alarm and emergency in star configuration to include data loading at high speed to upgrade and update e-shopping programs including particulars of products and services into distances above the limits of 100 m of the CAT5 cable or via a single twisted pair cable, or a single twisted pair of multi twisted pair cable such as the CAT5, including the feeding of DC power via the same single pair or separate single pair.

SUMMARY OF THE INVENTION

The objectives of the present invention are apparatuses and methods for propagating two way combinations of information signals including the propagation of audio, video, data, control, alarm, and emergency signals between a central signal processing or distributing or routing unit termed main router or main unit or matrix unit.

The terms tenant, dweller, user or shopper hereafter refers to an e-shopper or an e-buyer that search for and/or orders services or merchandise via a shopping terminal and/or defines, selects and restricts the services and merchandise programs to be loaded into his shopping terminal to his conveniences and desire.

The terms dwelling, residence and apartment refers to any single unit of a residential and/or commercial building be it for living, office or business.

The term shopping terminal hereafter and in the claims refers to a video interphone monitor, a dedicated shopping terminal, a cable TV, an interactive TV, a TV set, a set top box, a shopping box, an antenna adaptor box, a satellite adaptor box, a cable TV box and any other similar box and combinations thereof that are connecting at least one TV programs provider to a television or cable television set.

The shopping terminal comprising an operating display screen, a memory for storing shopping programs, content and other shopping services and merchandise particulars and a CPU for enabling the operating and choosing e-shopping to include services or merchandise or both. The shopping terminal can be operated via a built-in operating display screen and touch icons, by an associated display screen, by voice, by remote control devices or by movements of hands or other parts, such as the eyes of the dweller.

The terms main router, main unit, matrix unit, router, matrix and switch hereafter and in the claims refers to an intersecting unit for at least one of processing, selecting, distributing, routing, switching, temporary storing and buffering information signals between a server of at least one building and the internal communication lines of said building.

The term information signal hereafter and in the claims refers to any individual signal selected from a group comprising audio signal, video signal, data signal, code signal, control signal, alarm signal, emergency signal and to combinations thereof, propagated one way, bidirectional and a combination thereof.

The term e-shopping signal hereafter and in the claims may comprise any of the signals of the information signals individually and any of the combinations thereof one way, bidirectional and a combination of one way and bidirectional signals of a processed and/or completed order including modulated signals such as ASK (Amplitude Shift Keying), FSK (Frequency Shift Keying) or any other modulated signals for loading, upgrading, updating, adding, modifying and/or deleting or downloading signals pertaining to the e-shopping programs and content.

The main, main router or matrix unit connects and/or links one or plurality of shopping terminals, one or plurality of entry panels of a building, one or plurality of local concierge stations, local guard stations, local security stations of local building and/or of a whole neighborhood, including local stations of office buildings and similar local service facilities, distinctly characterized by being directly connected or linked to the matrix for selectively communicating information signal, via the matrix, with any of the stations and/or any of the shopping terminals.

The term server in the following description and in the claims refers to a well known computing server for providing information stored in its one or more memories and for processing received e-commerce orders via a network such as the internet.

The term stand-alone server is to a serve with built-in at least one memory containing the entire programs for operating with a closed circuit e-commerce with other servers of the closed circuit, and with data pertaining the services, product, information or other tasks the server is to perform within the closed circuit e-commerce.

The term "server and a cloud computing" refers to a server services provided by the well known cloud computing such as a cloud computing services and memory offered by Amazon or Microsoft or IBM.

The term "local" or "locally connected" defines the connection particulars and not the physical location of a local concierge or e-concierge and other recited station, unless the term local is specifically recited or identified with a given location, and with the station physical position, place or the distance or distances are specifically recited vis-à-vis any of the other stations, the matrix and the shopping terminals.

A "local" delivery station or "local" delivery terminal or an e-shop that are connected via a network to the building server, is not regarded as "locally" connected, even though it is physically inside a building or building complexes.

The term "distant" refers to any delivery station or shop that is physically located outside the building or the building complex. The term distant is not a reference of measurement in meter, Km or miles and does not relate to how the delivery station is connected to the network.

The shopping terminals of the present invention, disclosed in the referenced US patents and the corresponding patents issued in many countries, comprising shopping programs, including products, prices, invoicing and payments, delivery particulars and other material and process data pertaining the e-shopping and e-services. The programs stored in each shopping terminal are limited to a selection by each dweller individually.

Such individually selected data must be updated regularly to each shopping terminal, be it at given designated times regularly, at random and periodically. This mandates the providing of the needed power to allow the processing of update data by the matrix and each of the shopping terminals connected to the matrix individually.

The referenced U.S. Pat. No. 5,923,363 discloses a method for powering each video interphone monitor via the communication line extended between the monitor and the central unit by feeding a regulated current to a rechargeable battery, associated with the video interphone monitor.

The advantage of feeding regulated current via the communication line connecting the matrix with the shopping terminal is obvious, controlled DC current can be fed along with the information signal via the same single twisted pair, which offers substantial advantages, such as cost and simplicity.

Accordingly another object of the present invention is to provide the method and apparatuses for propagating two way information signals including high speed propagation for updating and loading shopping data particulars, content and programs via a single twisted pair that also feeds controlled DC current to the shopping terminal.

The power fed via the transmission line or the twisted pair provides for yet another object of the present invention, which is the ensuring that all the circuits of the matrix and the shopping terminal involved with the updating and loading processes are powered at all time, regardless of power cuts and other power supply irregularities.

The updating and loading of shopping signals to the memories of the shopping circuit of the shopping terminal includes the updating and loading many pictures and illustrations of products and services at fast speed. Propagating information signals via one twist pair, such as a single pair of a CAT5 cable, are limited to 100 m or 330 ft. with recommendations to limit the cable length to 60 m or 200 ft. for a network such as Ethernet 10 Base-T or faster.

In large high rise buildings such limitations cannot be met in a star connections, linking a matrix with the residences, and the other objectives of the present invention is to provide a fast signal propagation to well over 150~200 m distances.

As will be detailed later, this is achieved by propagating FM modulated data onto a carrier selected from of 10~20 MHz or higher carrier frequencies, for providing bandwidth of 4 MHz or more for the high speed data needed to update and load the shopping data particulars including products and services pictures and illustrations data.

As will be explained later a carrier frequency of 12 MHz, for example, enables to propagate FM modulated analog video signals to well over 200 m via a single twist pair and the same FM modulator is used for FSK modulation for propagating the high speed data to the shopping terminals.

Even though the attenuation of a propagated signal in a range, such as 10~20 MHz, enables propagation distances of the signals to well above 200 m and with S/N ratio that is well within the designed circuits operating range, there are other limitations that need to be overcome.

It is well known that the CAT5 cable limitations are not due to attenuation and signal to noise (S/N) only. The other limitations are the propagation delay time and collisions.

To overcome propagation delay and collisions the present invention other objectives is to limit the high speed data propagation to a continuous non interrupted one way transmission, or to a non-interrupted series of packets, or to other forms of timing structured transmissions for the purpose of loading, updating, adding and modifying the data stored in the shopping terminal memory, and provide a separate modulation medium such as ASK at a lower speed for propagating two way commands, disclosed in the referenced application Ser. No. 13/599,275 to be a preprogrammed coded signals, known as protocols.

This design makes it simple to upgrade and update at all times the shopping programs and content, with no collisions, timing limitations or other communications obstructions, while enabling simultaneously propagated two way command for operating the matrix, the shopping terminal and the building server with no propagation limitations. The building server is discussed later.

The propagation of signals be it digital data or analog signal over a twisted pair mandates the signal to be a differential or balanced signal to eliminate noise, improve the S/N and the standing wave ratio. Differential signals must be fed through the twisted pair with ⊕ and ⊖ polarities as prevailing in networks throughout. In practice, the installers and electricians repeatedly connect some of the twisted pairs to systems devices of video interphones and similar in reversed polarities, mandating re-visit and re-connect the many devices that are unable to communicate, because of the wrongly connected lines in reversed polarity.

The present invention, similar to the prior shopping terminals and video interphones, is designed to power the shopping circuits of each shopping terminal or each of the entire shopping terminal unit via a rechargeable battery. The battery is charged continuously via the same twisted pair carrying the information signals. The DC power polarity, similar to the differential signals polarity must be connected with no polarities error.

To remove such connection obstacles and provide error free connection environment, another object of the present invention is to introduce a non-polar connections to the twisted pair or pairs. With non-polar terminals for each pair, the installer is not required to identify the ⊕ terminal and the ⊖ terminal prior to the connection, and/or verify the connected polarities, after he connects the pair to its terminals.

Yet, another objective of the present invention is to secure the internal communication lines formed by the plurality of individual twisted pairs connected in a star configuration to the main unit, termed also the matrix. Each line comprising a twisted pair extended between each individual shopping terminal and the main unit or the matrix terminals.

Each line must be designed to prevent an intrusion for the purpose of cyber theft and this is achieved by introducing to each and every line the circuits that process and propagate the referred to above information signals, comprising signals selected from a group, modulate/demodulate video signals, two way audio signals, encode/decode two way ASK signals, data signals, alarm signals, coded control signals, emergency signals, encode FSK data signals and combinations thereof.

The introduction of the processing circuits into each individual line is a physical prevention circuit for preventing any possible cyber theft attempt from communicating with the shopping terminal or the matrix, thereby fully protecting the cabling from outside/inside intrusion.

Further the introduction of individual signal processing circuits referred to above enables to rout or switch on-off the individual information signal such as video, or audio, FSK signals and ASK signals to be directed or routed by a well known routing and/or on-off switching circuits between the building server that serves the e-commerce comprising e-services and e-shopping to the building or buildings through a network selected from a group comprising dedicated network, private network, public network, the Internet, Virtual Private Network (VPN) and combinations thereof.

The building server may include a large memory capacity and/or memory buffer but may be integrated into or use the literal limitless capacity of a cloud computing of the well known cloud computing providers such as Amazon. Alternatively the closed circuit e-commerce of a whole country or for global purposes may install such cloud computing facility designed and set for replacing some or all of the closed circuit e-commerce servers of a given system.

Alternatively, for minimal systems such as for a single grocery provider for a neighborhood or for one residential tower via one or few delivery stations, the closed circuit e-shopping may use a dedicated network with two or few servers, linking at least the example of tower building and at least one provider. For the two only connected servers to the dedicated network, the e-shop server can well manage the credit, payments and the entire operation of the closed circuit e-shopping entity.

It is important to note that regardless of the system size the individual processing circuits further shields the system from cyber-crimes including attempts by any of a locally connected peripheral system linked to the matrix or the main unit via the interfaces such as concierge station, management office, swimming pool, health club, and combinations thereof.

BRIEF DESCRIPTION OF THE DRAWINGS

FIG. 6A is an expanded version of the system of FIG. 5B using three pole selectors for linking selectively n entry panels to n circuits of FIGS. 3A and 3B;

FIG. 6B is an electrical block diagram showing a portion of a modified main unit of FIG. 6A using four pole selectors for linking selectively n interfacing modules to n circuits of FIGS. 1A and 1B.

FIG. 7 is an electrical block diagram comprising a plurality of the circuits of FIGS. 1A, 1B, 2A and 2B connected via a central unit using plurality of four pole selectors or routers for selectively linking n circuits of FIGS. 2A and 2B with n interfacing modules;

FIG. 13 is a block diagram similar to the closed circuit e-shopping shown in FIG. 12, but comprising combinations of cable TV, terrestrial TV, set-top box, dedicated shopping box and dedicated shopping terminal;

DETAILED DESCRIPTION OF THE PREFERRED EMBODIMENT

Figure 1A:
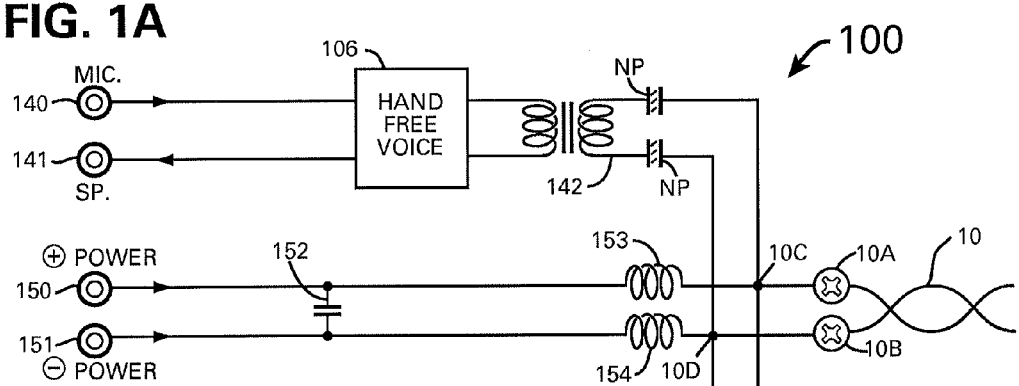
FIGS. 1A and 1B are electrical block diagrams of circuits connecting the one end of a twisted pair to a selector or router of the main or matrix unit of an internal communication line of a video interphone or an e-shopping system infrastructure of the preferred embodiment of the present invention.
Figure 1B:
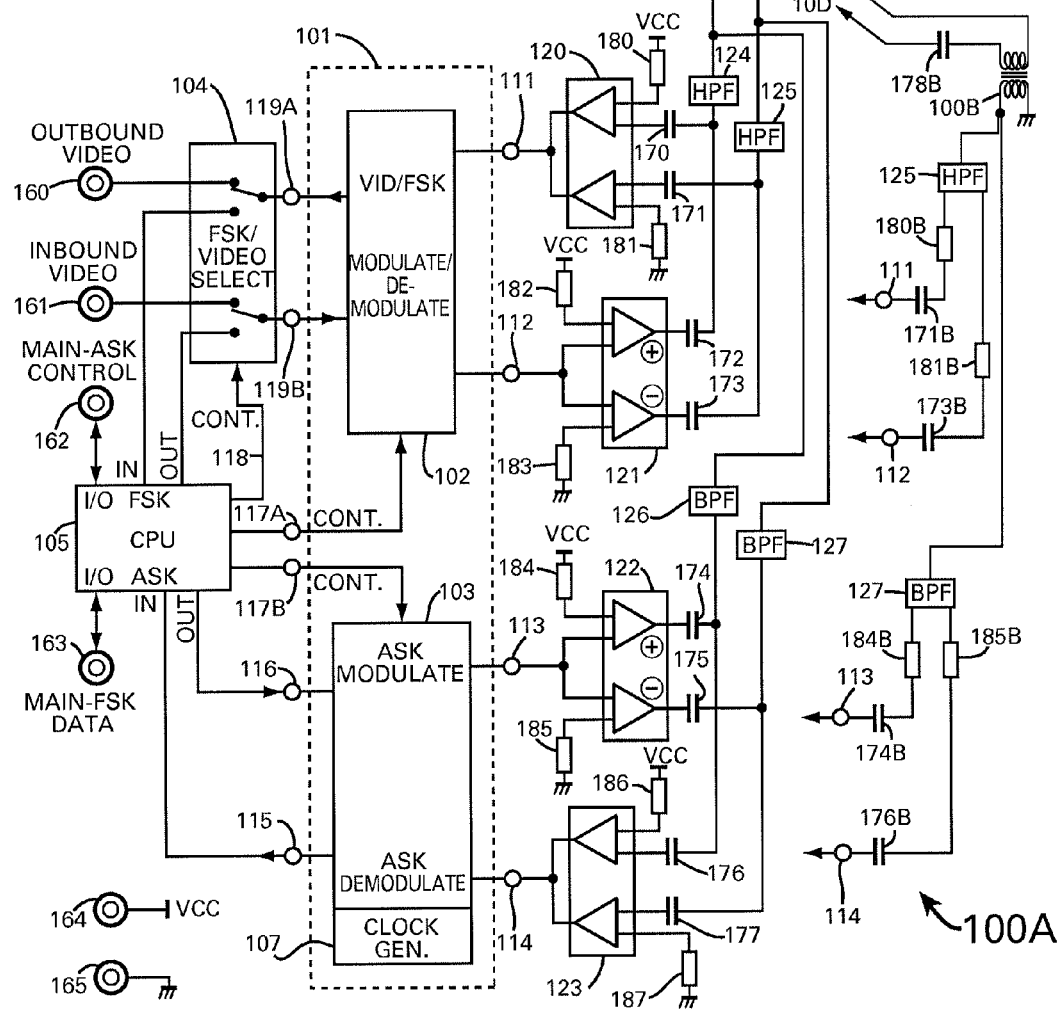
Figure 2A:
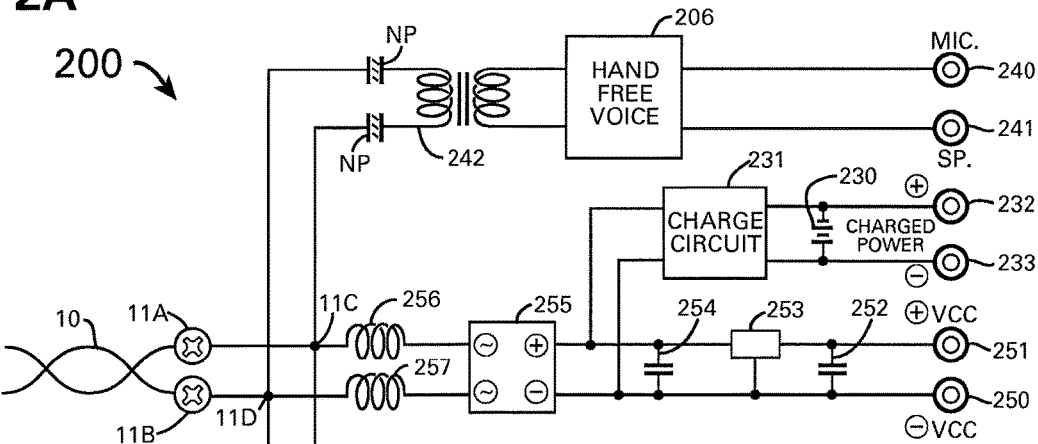
FIGS. 2A and 2B are electrical block diagrams of circuits connecting the other end of the twisted pair of FIGS. 1A and 1B to a video interphone monitor or to a shopping terminal of the preferred embodiment of the present invention.
Figure 2B:
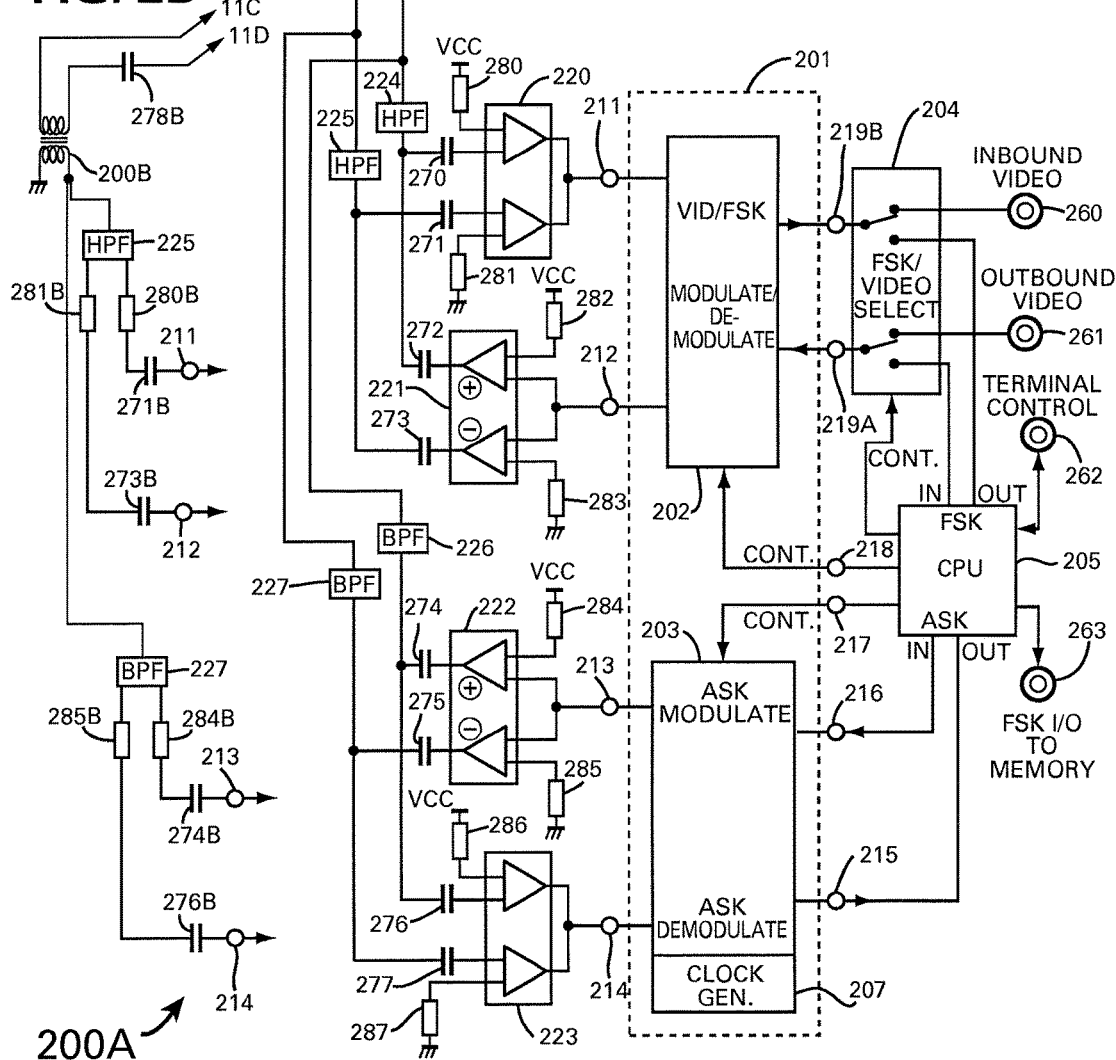

FIGS. 1A~B show a block diagram of a circuit 100 to be connected between one end of a twisted pair 10 to a selector or router 540-1, 510-2 or 540-n of FIG. 7 for processing the information signals propagated via the twisted pair 10 between the two complementary circuits 100 and 200 of FIGS. 2A~B connected via the terminals 10A-B of FIGS. 1A~B and 11A-B of FIGS. 2A~B. The processed information signals comprising two way or bidirectional video signals, two way audio signals, two way or bidirectional ASK modulated data signals and two way FSK modulated signals. The signal ports or terminals are shown as one way microphone signal port or terminal 140, one way speaker signal terminal 141, two power terminals 150 and 151, two way or bidirectional video terminals 160 and 161, two way ASK control and command signals terminal 162 and two way FSK data signals terminal 163.

The ASK and/or FSK signals are transmitted, received and/or exchanged through the CPU 105, propagating signals comprising data, codes, controls, commands, alarms, emergencies, queries, reports, responses and combinations thereof. The ASK and/or FSK signals further including as the case may be, digital audio and/or digital video signals and other modulated ASK and FSK information and/or communication signals and any combinations thereof. The CPU 105 propagates two way ASK (Amplitude Shift Keying) modulated signal via terminals 115 and 116 of the ASK modulate-demodulate circuit 103 as well as FSK (Frequency Shift Keying) modulated signals via the FSK/video selector 104 and the FSK modulate-demodulate circuit 102.

The FSK, video and ASK modulate-demodulate circuits 102 and 103 are well known frequency and amplitude modulator-demodulator, also known as Frequency Modulation (FM) and Amplitude Modulation (AM) and are commonly available at low cost, packaged into a single IC 101 shown in a dashed line in FIG. 1A. The ASK needs to be fed with a clock at a selected frequency and the preferred embodiment uses clock signal in the range of 0.5~1.0 MHz. The clock generator 107 attached to the ASK modulator-demodulator 107 can be a circuit included in the IC package 101, or it can be an input for a clock to be fed for example from the CPU 105 or crystal (Xtal) oscillator or it can be an oscillator using a discrete components, forming a well known clock generator.

The preferred embodiment employs 12.5 MHz base frequency for the FSK modulator-demodulator circuit and the oscillator is a built-in oscillator, but can be a connected oscillator such a Xtal oscillator, similar to the clock generator of the ASK modulator-demodulator. It is preferable to use a single clock generator for providing a synchronous time base for both the ASK and FSK.

Figure 11A:
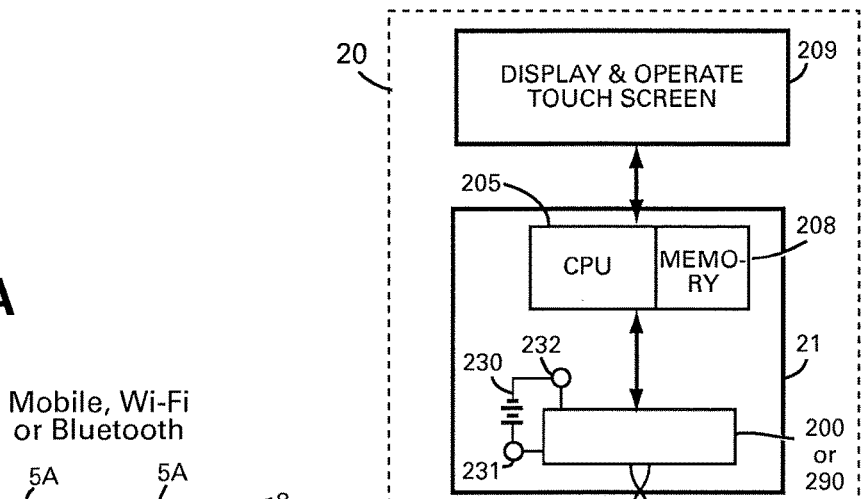
FIG. 11A is a block diagram showing the shopping circuit of the shopping terminal including the circuits shown in FIGS. 1A~4B, the main unit, the server and the link to network of the closed circuit e-commerce of the preferred embodiment.
Figure 11B:
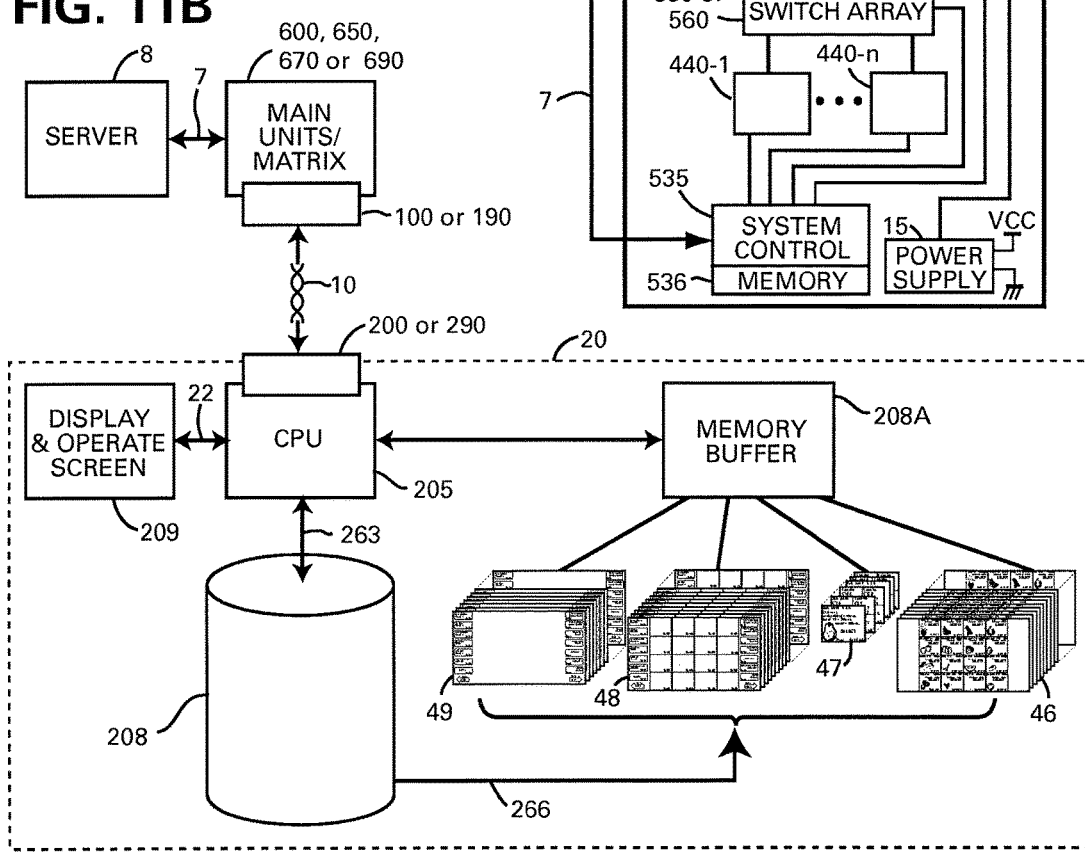
FIG. 11B is an illustrative block diagram showing the memory structure of the shopping terminal, the updating rout for shopping particulars fed by the server via the main unit, the CPU and into the memory including the recall of shopping display pages into a memory buffer.

The CPUs 105 and 205 of FIG. 2A may use a memory buffer such as the shown buffer 208A of FIG. 11B or use an incorporated or a built-in memory 208 or 536 shown FIG. 11A incorporated into the CPUs 205 and 535 for timing of the ASK command and the FSK data propagation for a flawless synchronous processing of data.

The FSK/video selector 104, shown as a pair of electrical contacts for illustration only, the selector is a well known semiconductor circuit, such as multiplexer or semiconductor switch using FET or other switching transistors. The pole terminals 119A and 119B can operate together or independently by a control command fed from the CPU 105 for connecting, for example, the input of the modulator to FSK input and command simultaneously the modulator to modulate the data fed from the CPU FSK out terminal and thereby outputting an FSK signals via terminal 112 to the differential amplifier 121.

Even though the ASK and FSK signals are shown connected via separate in-out terminals such as the 115 and 116 for the ASK signals and 119A and 119B for the in-out FSK signal via an in-out ports of the CPU 105, both the ASK and FSK data signal ports can be bidirectional and operating in either direction with both respond to a command propagated to the FSK/video selector 104, to the FSK modulate/demodulate 102 and to the ASK modulate/demodulate 103 via the control lines such as the shown line 117A, 117B and 118 respectively. Further it is preferable to use a single I/O port and control line to be programmed for controlling the two modulate/demodulate circuits 102 and 103 and depending on the combined circuit 100 also to control the selector 104.

The differential amplifier 121 will output the modulated signal, be it the FM modulated video or the FSK data, via the capacitors 172 and 173 to remove DC components and feed the modulated signal through the high pass filters (HPF) 124 and 125 and through the twisted pair terminals 10A and 10B to the twisted pair line 10 for feeding the FSK data or the FM modulated video signal to a complementary circuit 200 of the shopping terminal shown in FIG. 2A.

The FM modulated video signal of a video camera such as a camera of a video interphone entry panel and the FSK data signal propagation for upgrading/updating the memory of the shopping circuit with data pertaining to the shopping, the products and the services with particulars is termed or reflect the movement of the signals hereafter as inbound communication, inbound direction or inbound propagation.

An FSK data or an FM modulated video signal from the shopping terminal circuit 200 fed in reverse direction is termed to reflect signal movement hereafter as outbound communication, outbound direction or outbound propagation. The outbound signals are propagated via the HPF 124 and 125, the coupling capacitors 170, 171 and the differential amplifier-buffer 120 to the video/FSK modulate/demodulate circuit 102 for demodulating and feeding the FSK signals propagated from the shopping terminal circuit 200 to the input FSK port of the CPU 105 or feeding the demodulated video signal to the video out terminal 161. The CPU 105 processes the FSK or the video data signal received on the basis of the command processed via the CPU 105 and the FSK/video select 104 direction.

It is clear from the above that each of the FSK data signals or the FM modulated video signal, both having a carrier frequency of such as 12.5 MHz referred to above is propagated in two directions via the differential amplifier 121 and amplifier-buffer 120. The differential FM modulated video and the differential FSK data signals are propagated via the twisted pair 10 between the circuits 100 and 200 via high pass filters 124, 125, 224 and 225 and thereby are separated, as will be explained later, from other signals that are propagated via the same twisted pair 10 between the circuits 100 and 200.

The resistors 180~187 of FIGS. 1A and 280~287 of FIG. 2A are references resistors for the operational amplifiers 120~123 and 220~223 of FIGS. 1A and 2A respectively. References may comprise more than one resistor each and/or comprise coils, capacitors and resistors arrays.

The ASK signals selected from a group comprising data, shopping, command, control, alarm and emergency are propagated two way between the circuits 100 and 200 of FIGS. 1A~B and 2A~B. The clock frequency of the ASK as referred to above is for example 0.5 MHz which enables a bidirectional data at a rate of 125K Baud.

Similar to the FSK differential amplifier and amplifier-buffer 121 and 120, the ASK differential amplifier 123 and amplifier-buffer 122 propagate the bidirectional differential ASK data signals via the outbound terminal 113 and the inbound 114 terminal, the coupling capacitors 174, 175, 176 and 177 and the band pass filters 126 and 127 and through the terminals 10A and 10B and the same twisted pair 10 for communicating the bidirectional differential ASK data with the circuit 200 of the shopping terminal of FIGS. 2A~B.

The band pass filters (BPF) 126, 127, 226 and 227 of FIGS. 1A~B and 2A~B are calculated to pass signals within a given band, ranging for example, from 200 KHz to 800 KHz, providing substantial separating distance from the audio signals that are propagated in their real time or basic frequency range of approximately 80 Hz~8 KHz and from the FM modulated video or FSK data having carrier frequency of 12.5 MHz and band width of, for example 5~7 MHz, assuring that the lowest shift frequency remains above 5 MHz.

The separation of the ASK band ranging from 200 KHz~800 KHz, including harmonics and other stray signals and noises from the audio band that including harmonics may reach a maximum of 50 KHz and from the FM video/FSK signals having a band that its lowest frequency is over 5 MHz. It is obvious and clear that a separation of 150 KHz from the audio band and over 4 MHz separation from the FM video/FSK band are substantial and allow the three groups of signals comprising audio, ASK and FM video or FSK data to be propagated over the same twisted pair simultaneously, one way and/or bidirectional.

FIGS. 1B, 2B, 3B and 4B show a well known circuit of another preferred embodiment of the present invention using balun transformers 100B and 200B that propagate a wide band signals ranging for example from 100 KHz to 1.0 GHz, between non balanced and balanced lines with varying line impedances and signal sources, bidirectional and simultaneously.

The circuits 100A, 200A, 190A and 290A shown consume no power, using few passive components to replace the entire blocks of the buffer amplifiers 120, 123, 220 and 230 and the differential amplifiers 121, 122, 221 and 222, the coupling capacitors 170~177, 270~277 and the reference resistors 180~187 and 280~287, all of which are not needed and are not used.

The bidirectional circuit 100A connects the ASK modulate-demodulate terminals 113 and 114 via coupling capacitors 174B and 175B, line resistors 184B and 185B, a single band bass filter 127 and the balun (balanced-unbalanced) transformer 100B.

The bidirectional FSK modulate-demodulate terminals 111 and 112 are connected to the balun 100B via the coupling capacitors 171B and 173B, the line resistors 180B and 181B and the high pass filter 125. The balun 100B is connected to the connecting points 10C and 10D of the twisted pair terminals via the coupling capacitor 178B, replacing the bidirectional differential circuits and maintaining in full the one way and bidirectional propagation of all the referred to above signals including any combinations thereof with no signal degradation.

The significant difference between the balun circuit 100A and the differential circuits of the circuit 100 is the noise immunity and the radiation of noise (EMI).

This makes the selection between the two circuits a design choice based upon the signals and the environment surrounding the internal communication lines and the type of the lines. As will be discussed later, the shown single twisted pair is also a selection or a choice for the internal communication lines between a single and plurality of twisted pairs.

The balun circuits 200A of FIG. 2B are literally identical with the balun circuit 100A. The shown differences are the numerals of the coupling capacitors, such as 171B~178B or 271B~278B, the line resistors, such as 180B~185B or 280B~285B, the balun numeral 100B or 200B and the connections to the terminals 100 or 10D or 11C and 11D. Otherwise the circuit 100A is identical with the circuit 200A and both are complementary circuit to the other.

Figure 3A:
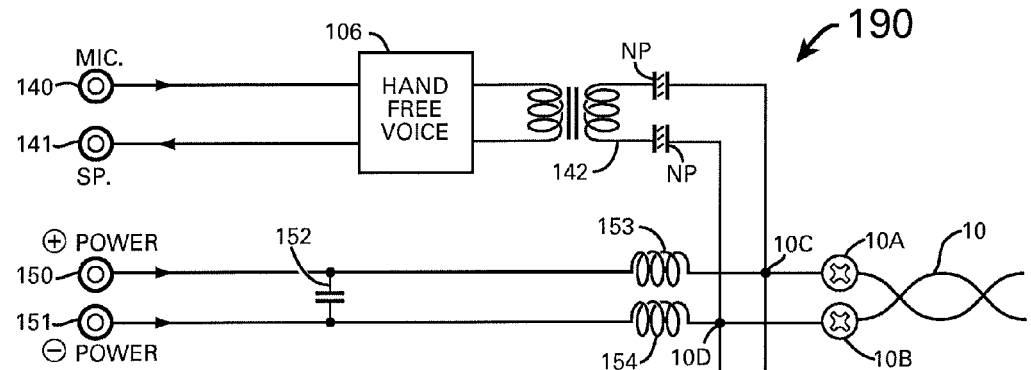
FIGS. 3A and 3B are modified block diagrams of FIGS. 1A and 1B propagating only one way FM modulated video and one way FSK modulated signals.
Figure 3B:
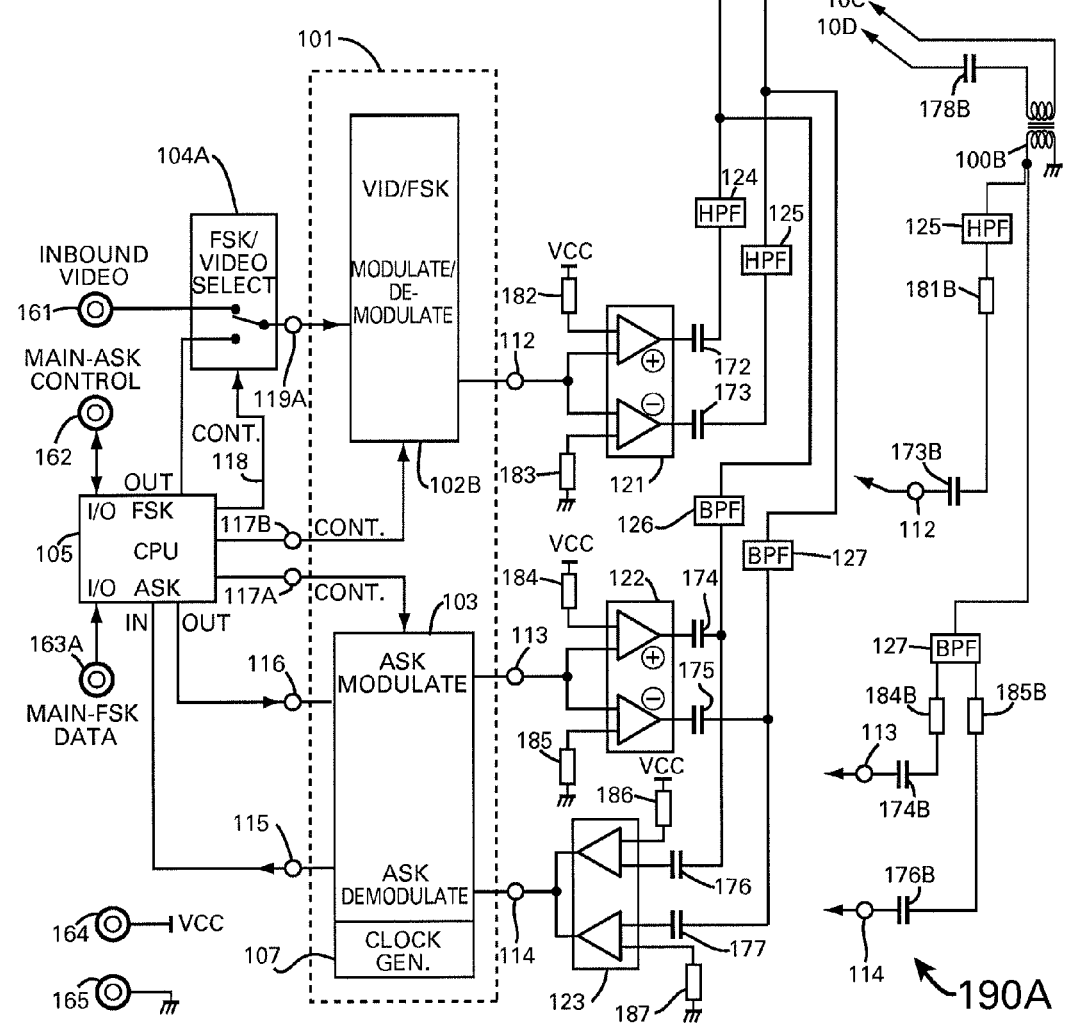
Figure 4A:
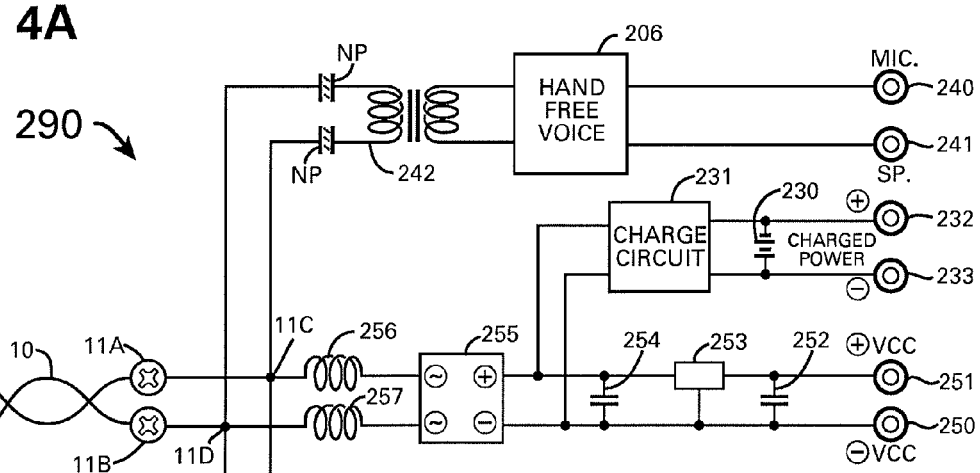
FIGS. 4A and 4B are modified block diagrams of FIGS. 2A and 2B communicating only one way FM modulated video and one way FSK modulated signals.
Figure 4B:
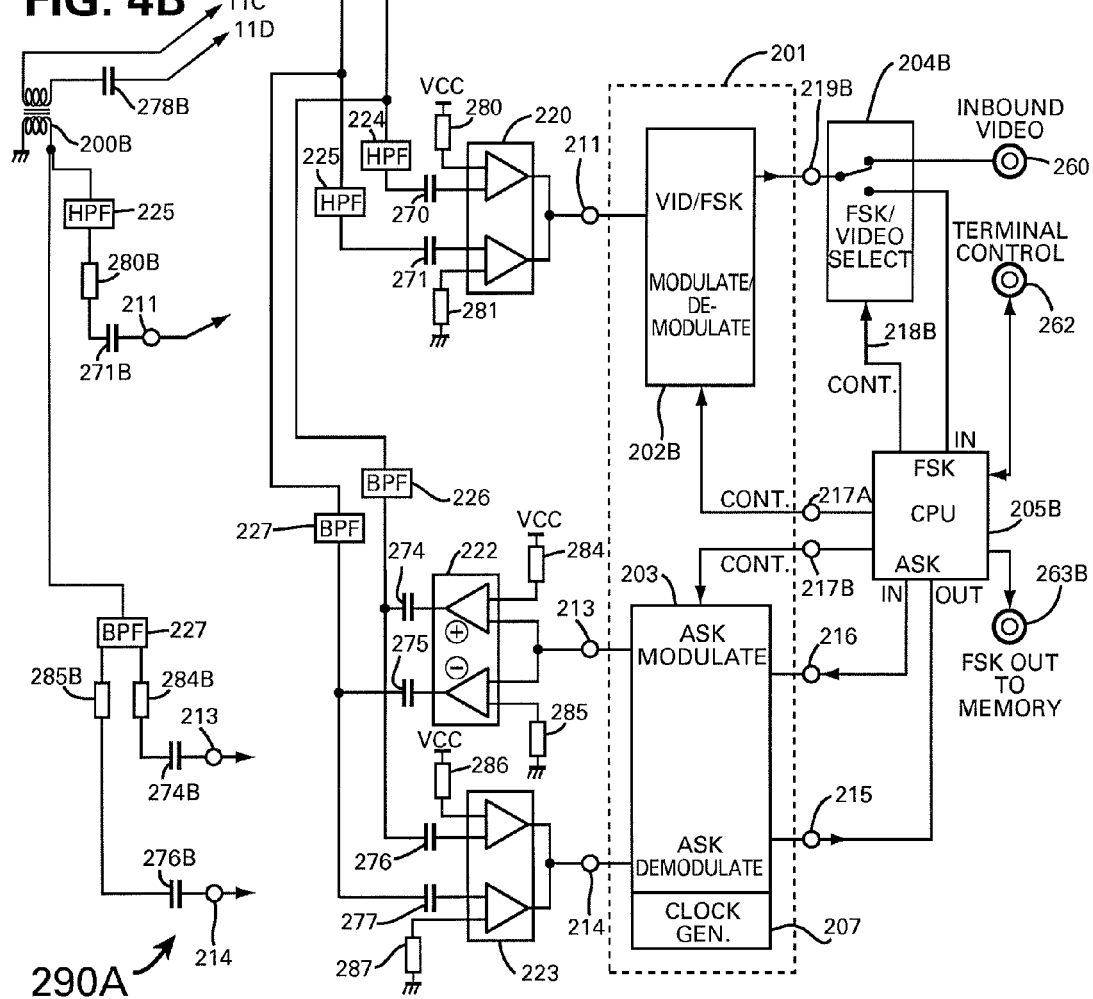
Figure 8:
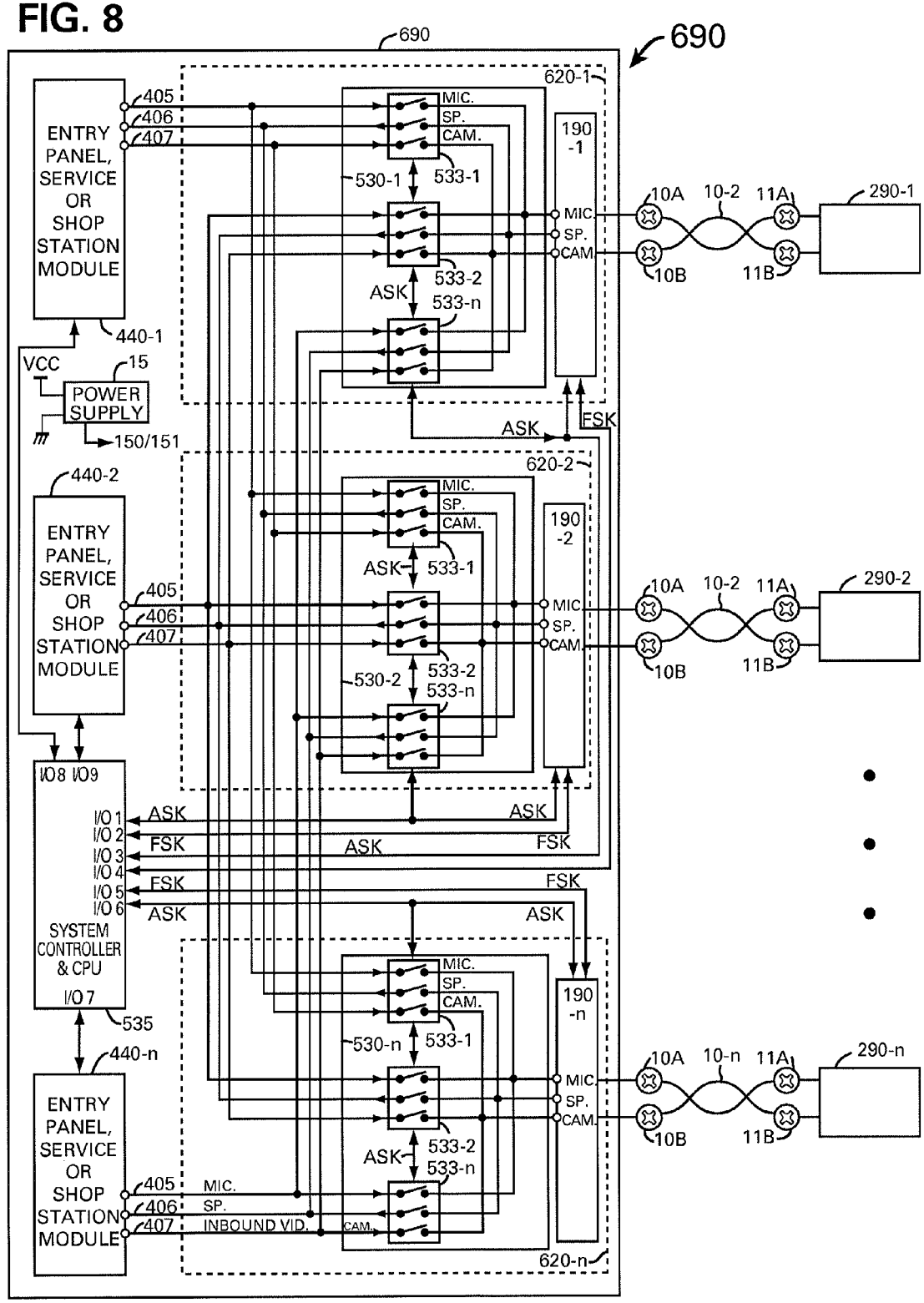
FIG. 8 is an electrical block diagram similar to FIG. 7 comprising plurality of the circuits of FIGS. 3A, 3B, 4A and 4B with a limited propagation of FSK data or FM modulated signal to one way using plurality of three pole selector or routers.

The same numerals are used for the circuits 190A and 290A of FIGS. 3B and 4B, as used for the circuits 100A and 200A. The only difference between the circuits 100A and 190A or 200A and 290A is the one way FM video and FSK data as used for video interphone system combining the e-shopping circuits 20 such as shown in FIGS. 8, 11A and 11B.

The propagated bidirectional audio signal, such as wired telephone signal propagated via a twisted pair, requires matching impedances at the ends of the line. For providing good audio termination, particularly when the DC power for operating the circuit 200 of FIG. 2A is fed through the twisted pair, such as commonly provided in wired telephones, the termination is preferably provided by an audio line transformers 142 of FIGS. 1A and 242 of FIG. 2A.

The transformers are connected to the twisted pair terminals 10A and 10B via two non-polar capacitor NP. The reason for using the non-polar capacitors is the DC power polarity fed to the shopping terminal of FIG. 2A via the twisted pair 10. The power and signaling feed are preferably designed to enable non-polar twisted pair connections between the terminal 10A and 10B to the terminals 11A and 11B.

Such non-polar connections will feed the power polarity in two ways at random, and therefore the two capacitors NP connecting line 10 via the terminals 11A and 11B to the line transformer 242 are non-polar capacitors, and not the well known polarized capacitors for DC connections. The non-polar state is not the same for the two capacitors NP of FIG. 1A.

The power terminals ⊕ 150 and ⊖ 151 are shown in FIG. 1A connected in the given polarities to the main unit 600 or 700 of FIGS. 7 and 8 and polarized capacitors such as electrolytic or tantalum capacitors could be used. However as capacitors impedance vary with the capacitor types and structure and to ensure identical impedance at both ends of the twisted pair it is preferable to use identical capacitors NP at both ends of the twisted pair 10 as shown in FIGS. 1A and 2A.

The primary coil of the line transformer 142 is connected to a hand free voice communication IC, which is a well known IC used in many types of hand free audio communication, such as conference telephones and the well known hand free video interphone monitors. The hands free refers to intercoms and telephones that are not provided with handset and/or are operated by keeping the handset on hook while talking to a microphone and listening to a speaker sound via openings provided on the main body of an intercom or a telephone unit. The hand free IC prevents howling and oscillation caused by a sound feedback from the speaker into the microphone.

The terminal 140 mic. and 141 sp. connect the two way voice signals, mic. and speaker propagated through the line transformer 142, the non-polar capacitors NP, the terminals 10A and 10B and the twisted pair 10 that is exchanging the referred to above ASK, FSK or FM video signal with the shopping terminals circuit 200.

The power source for operating the circuits 100 and 200 of FIGS. 1A and 2A is fed from a DC power supply, such as 12V or 15V or 24V or any other effective DC power for operating the circuits 100 and 200 including the LCD or other display screen for operating the video interphone, the shopping terminal and combinations thereof.

The shopping terminal disclosed in the referenced US patents include TV, cable TV and different well known boxes, such as set-top box, cable box, antenna converter box, satellite converter box and a dedicated shopping box. Accordingly it is advantageous to include the circuit 200 inside the TV, be it cable TV or antenna TV, and/or inside any of the referred to above well known boxes.

The TVs and the boxes are commonly powered via the AC power line of the residence, yet the TV or the boxes may be switched off, and if the circuit 200 is powered via the power supply of the TV or the box, the circuit will not be responsive to entry calls when it is used for video interphone function, moreover the circuit 200 will not be responsive to updates of shopping data, fresh loading and/or other upgrades and/or other particulars updating.

Accordingly it is preferred that the circuit 200 is powered via the non-polar transmission line. The power consumed by the circuits 100 and 200 are pre-defined, known and/or calculated and the preferred power feed is a pre-calculated current controlled value. Controlled current does not pass power line surges and prevents current fluctuation, thereby ensuring a fixed stable current flow, reducing communication disturbances from power supply sources and noisy loads that otherwise will affect the signal propagated via the same line, such as the twisted pair line 10.

The U.S. Pat. No. 5,923,363 discloses such controlled current for powering video interphone circuit including an associate rechargeable battery that enables to power and fully operate a video interphone for a given time duration. The shopping terminals and the video interphones recited in the referenced US patents are also provided with such charging circuits and associated rechargeable battery.

The shopping terminal circuit 200 and/or a dedicated shopping terminal are not commonly expected to be fully active 24 hours, 7 days a week. It is anticipated that a dedicated shopping terminal will operate short time of less than one hour at a time. Operation time duration of few hours per day by a rechargeable battery that is being charged continuously with a fixed pre-defined controlled current is well within a range of low cost rechargeable batteries, such as used for iPad and mobile phones throughout.

The main power supply 15 of the main unit 690 of such as shown in FIG. 6 feeds a controlled current via the terminals 150 and 151 connecting the power source of the controlled current via dual coils 153 and 154 and via the terminals 10A and 10B to the twisted pair line 10. The single capacitor 152 shown is a shunt capacitor for shorting any residual audio, ASK, FSK or FM signal. The capacitor 152 is shown as a single capacitor, however several capacitors such as ceramic, tantalum, mylar or electrolytic and combinations thereof can be used instead.

The coils 153 and 154 are preferably very large coils, such as 1 Henry, using very high permeability cores, with the coil windings and resistance are calculated to ensure that a short circuit at the terminals 10A-10B or along the twisted pair wire 10 will not damage the coils. The large coils present very large impedance and together with the capacitor 152 prevent any of the signals from reaching the power source for totally separating the signals from the DC power.

It is preferable that the windings of the coils are designed and made to ensure that careless connection and mishandling of wires and polarities will not damage the coils themselves, the main unit, its circuits and components, including the power components. Moreover, the non-polar connection releases the installer from the need to conform with the connection polarities. The non-polar enables the installer to connect the twisted pair with any which polarity to the terminals 10A and 10B and regardless of the DC polarity the circuit will function properly, providing of course that no shorts are made during the connection.

The power fed through the twisted pair 10 is connected at its other end to the terminals 11A and 11B shown in FIG. 2A, that are connected to large coils 256 and 257 for filtering the signals out and feed the non-polar power to a bridge rectifier 255. The well known bridge rectifier will output via its polarized terminals shown as ⊕ and ⊖ and feed a correctly polarized power to the filtering and storage capacitor 254 and to the regulator 253.

The regulator 253 feeds its regulated output to the other filtering and storage capacitor 252 and to the VCC terminals 250 and 251, providing a defined power commensurate with the voltage and current consumed by the shopping circuit, not including the charging of a chargeable battery 230.

A built-in battery 230 can be introduced to the circuit 200, or such battery can be associated with or connected to the shopping terminal. Preferably the battery should be connected and charged by the circuit 231. The charge circuit 231 commensurate with the type of battery used and with an appropriate charging rate. The charging rate must be a portion of, or the sharing of, the pre-defined control current.

The fixed pre-defined current is calculated to enable the operation of the shopping circuit 200 in a standby mode and adequately charge the battery 230 simultaneously. When the shopping circuit 20 of FIG. 11A is operating in full including the display 209 the charged battery 230 will provide the needed power.

The introduction of an associated rechargeable battery 230 or similar is a matter of choice, including the powering of the circuit 200. The battery 230 of the preferred embodiment is selected for powering at least the circuit 200 and at least a portion of the shopping circuit including the memory 208 that stores the many pictures, prices, deliveries and availabilities 46, 47, 48 and 49 of FIG. 11B that must be updated at random and/or at a given pre-determined times.

The shopping circuit 21 comprising the CPU 205 and the memory 208 connected to the circuit 200 must be powered for at least a standby mode and ready to receive updates and upgrades of shopping particulars at all time, and not be dependent on the power on-off switch of the shopping terminal, or be cut by the unplugging of the AC power cord that connects a shopping terminal or the video interphone to the power source.

FIG. 2A shows the opposite circuit to the circuit shown in FIG. 1A that is mostly identical with the circuit 100, excluding the power output circuit 250~255, the battery 230 and the battery charger 231, for connecting the two circuits at the opposite ends of the twisted pair cable 10.

The video/FSK modulator/demodulator 202 and the bidirectional ASK modulator/demodulator 203 and the whole package 201 are identical with the same package IC 101 of FIG. 1A. Same applies the operational amplifiers and drivers 220~223, the reference resistors 280~287, the coupling capacitor 270~277, the BPF 226 and 227, the HPF 224 and 225, the NP capacitors, the line transformer 242 and the hands free voice IC 206, they are identical or similar to the circuits shown in FIG. 1A and explained above in detail.

The basic differences are the bridge rectifier 255 with the power connection terminals 250~251, the signal terminals 260~263 and the battery terminals 232 and 233. While the terminal 150 and 151 of FIG. 1A are connected to a power source the terminals 250 and 251 output the VCC to the circuit 200. The VCC for the circuit 100 is fed directly from the unit main power supply 15 of the main unit or matrix 600 to the terminals 164 and 165 of FIG. 1A.

The outbound video from the terminal 261 and the inbound video to the terminal 260 are shown to be reversed for the outbound and the inbound video from and to the terminal 160~161 of the circuit 100. The control and command terminal 162 is communicating ASK signals with the main or matrix controller 535 of the circuit in FIG. 7 and the same control and command terminal 262 of FIG. 2A is communicating with the main CPU 205 of the shopping terminal also shown in FIGS. 11A and 11B.

The FSK in-out is propagated to and from the memory 208 of the shopping terminal shown in FIGS. 11A and 11B, communicating the bidirectional FSK data via terminal 263, the twisted pair 10 and via the terminal 163 of the circuit 100 and with the main or the matrix controller 535 or with the server 8 shown in FIGS. 11A and 11B.

FIG. 3A shows the circuit 190, which is similar to the circuit 100 of FIG. 1A by limiting the FSK or FM modulated video to only one way propagation from the circuit 190 to the circuit 290 of FIG. 4A. The one way FSK circuit is essential for the closed circuit e-commerce, particularly for the need to update the stored data of the shopping terminal, stored in the memory shown as 208 in FIGS. 11A and 11B. The one way FM modulated video is essential for the video interphone systems for transmitting an image of a visitor.

The same apply to the circuit 290 of FIG. 4A, which is the circuit 200 of FIG. 2A but with only one way propagation of the FSK or FM modulated video from the circuit 190 to the circuit 290. Both the circuits 190 and 290 use the VID/FSK circuit 102 partly, the circuit 190 limits the circuit 102A to modulate function only and the FSK/video selector 104A as a single selector for selecting the inbound signal between the video or FSK data. Another change is the elimination of the differential amplifier-driver 120 and the differential amplifier 221, with all their peripheral components including the terminals 160 and 261.

Other elements, terminals and components shown in FIGS. 1A and 2A and are not referred to above in connection with the circuits 190 and 290 of FIGS. 3A and 4A are similar to and are common to all the four circuits 100, 200, 190 and 290. Moreover, references and explanations made to elements, terminals and components of any one of the two circuits of FIGS. 1A and 3A or FIGS. 2A and 4A are the same, particularly circuits 100 and 190 and circuits 200 and 290.

It becomes clear from the circuits 100, 200, 190 and 290 of FIGS. 1A, 2A, 3A and 4A that a single twisted pair can be connected between a main router or a matrix unit and a shopping circuit of a given residence or other singular unit of a building, for propagating bidirectional audio signals, one way and bidirectional ASK signals selected from a group comprising commands, control, alarm, emergency, shopping, coded data, any other data and combinations thereof, one way or bidirectional FM modulated video signal or FSK data and control including the feeding of controlled DC current and combinations thereof.

It also becomes clear that a rechargeable battery can be connected to, associated with or built into the circuit 200 of a shopping terminal of said singular unit of a building.

When the shopping terminal is a TV set or a dedicated shopping terminal or the well known box that are not connected to a video interphone of a building or a house, and no video from such units as entry panels or security cameras are propagated to the shopping terminal the circuits 190 and 290 of FIGS. 3A and 4A can be further reduced by eliminating the video/FSK selectors 104A and 204B and the terminals 161 and 260 respectively.

It is also clear that by removing the FSK/video selectors and fixedly connecting the FSK ports of the CPUs 105 and 205 of FIGS. 1A and 2A with no video propagation the terminals 160, 161, 260 and 261 can be eliminated along with the selectors 104 and 204 for providing such reduced circuit with bidirectional FSK propagation along with all the other signals referred to above, except the one way or the bidirectional video, yet an FSK modulated digital video signal can be propagated as will be referred to further below via the CPUs 105 and 205.

Similarly it will be possible to remove all the audio components such as the transformers 142 and 242, the hand free ICs 106 and 206, the capacitors NP and the audio terminals 140, 141, 240 and 241 and propagate any or a combination of the referred above signals without audio.

It is also clear that the circuits 100, 190, 200 and 290 shown in FIGS. 1A, 2A, 3A and 4A including FIGS. 1B, 2B, 3B and 4B can be modified, reduced in size and the number of components to provide best practical circuit for a selected one way and bidirectional communications of the referred to above individual signals and combinations thereof, with or without the DC power feed referred to above.

Figure 5A:
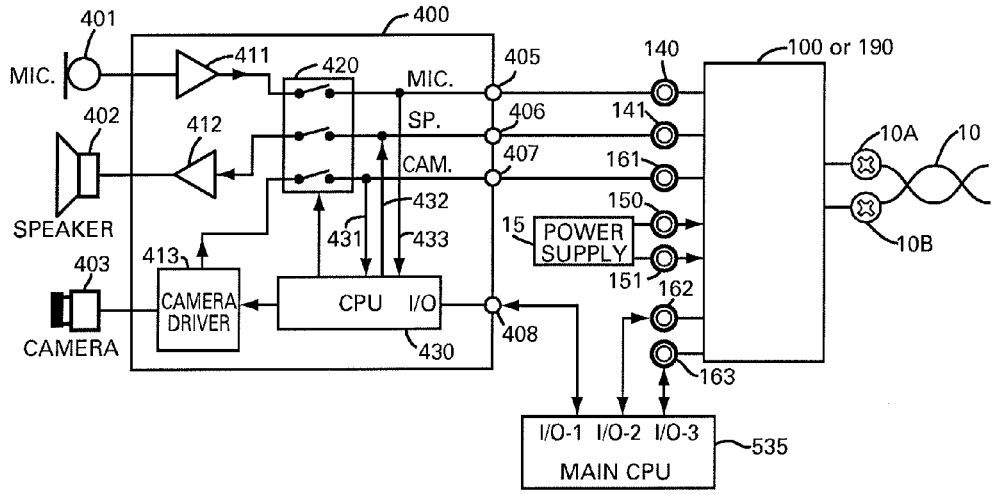
FIG. 5A is an electrical block diagram of a basic video interphone system infrastructure of the present invention connecting the circuit of FIGS. 3A and 3B to a single entry panel.

FIG. 5A is a block diagram of an entry panel 400 of a video interphone system connected to the circuit 190 referred to above. The entry panel comprising a microphone 401 and a microphone driver 411, a speaker 402 and a speaker amplifier 412, a camera 403 and a camera driver 413, a CPU 430 and a switch 420 for connecting/disconnecting a combined three signals comprising inbound microphone signal via terminal 405, outbound speaker signal via terminal 406 and inbound video via terminal 407.

Figure 5B:
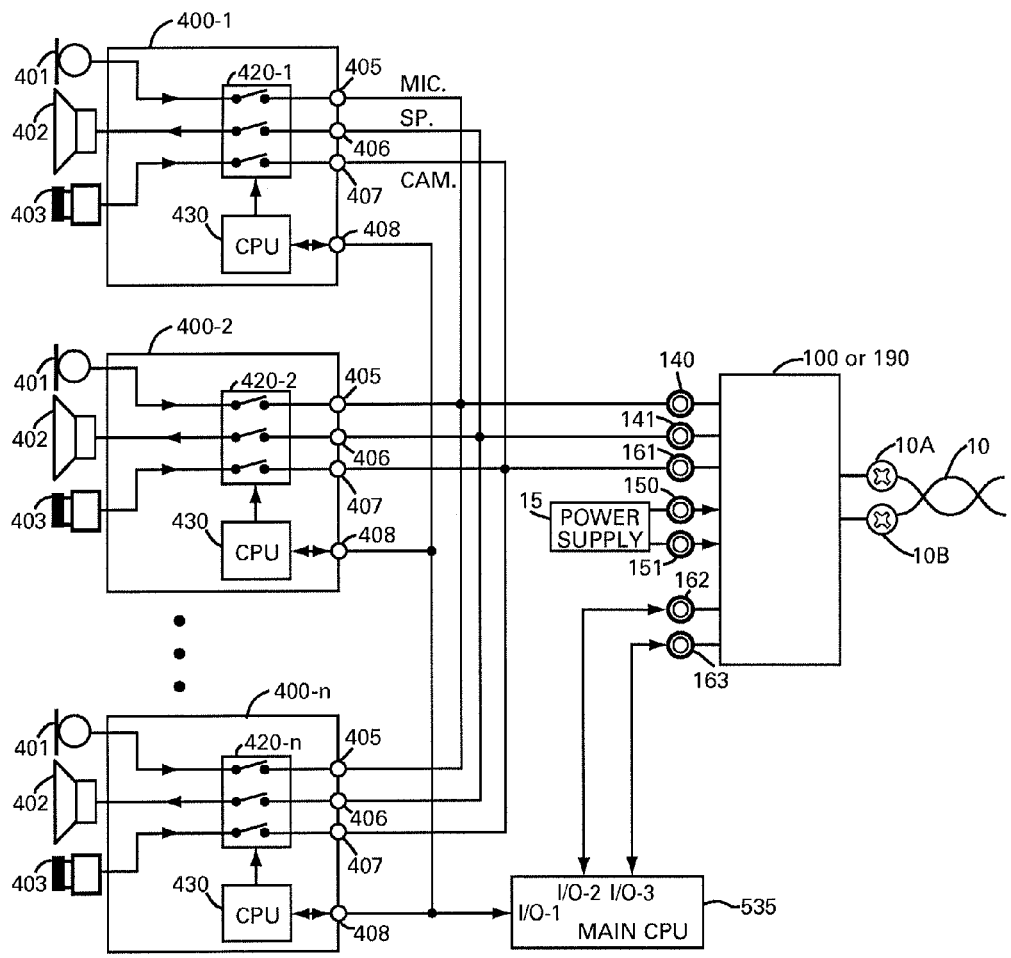
FIG. 5B is another preferred embodiment of FIG. 5A comprising n entry panels selectively connected to the circuit of FIGS. 3A and 3B.

The well known select keys, displays and other elements and features commonly provided for entry panels are not shown in FIGS. 5A, 5B and 6A. This is because the entry panels 400 of FIGS. 5A, 5B and 6A are to illustrate the unique and inventive routing-selecting of the inbound-outbound signals propagation via interface module 440 and the main unit 600, also termed matrix or router, from any of the entry panels 400 and/or the e-service and/or e-shops communication interface modules 440 shown in FIGS. 6A, 6B, 7 and 8.

The switches 420 shown in FIGS. 5A, 5B, 6A and 6B are shown as a mechanical contact switches for simplifying the explanation. The preferred embodiment of the present invention employs digital or analog routing or switching ICs that are well known and are commonly available at low cost from many IC manufacturers worldwide.

The voice and video signals can be analog or digital, compressed or non-compressed, digital audio and video signals are routed via the systems CPUs 205, 105, 430 and 535. Analog audio signals are connected and routed via terminal 140 (mic.) and 141 (sp.) and analog video signals, by the camera 403 or other video source, are connected and routed to terminal 161.

The video signal that is generated by the camera 403 refers to a camera used with the entry panel 400 of a video interphone system, however when the video interphone monitor comprising a shopping terminal circuit 20 of FIGS. 11A and 11B and the video signal is connected and routed via the terminal 161 can be any video signal fed from the interface module 440 shown in FIGS. 6A, 6B, 7 and 8. The interface module provides for linking with entry panels, e-service and e-shopping providers and the switch 420 shown inside the entry panels 400 of FIGS. 5A and 5B are preferably included in the interface module 440 shown in FIGS. 6A, 6B, 7 and 8 for connecting and/or routing any video signal generated by the camera 403 and any video signal propagated from the e-service and the e-shopping providers shown in FIGS. 12 and 13.

When an audio signal, be it the microphone signal, the speaker single and/or including the camera signal or any other video signal referred to above are digital signal the connection and routing are differently handled.

The digital audio and/or video need to be routed through the higher speed FSK modulated signal and therefore the microphone terminal 140, the speaker terminal 141 and the video terminal 161 are not used and instead the signal will be connected and routed to the I/O ports 431~433 of the CPU 430 of the entry panel 400 or the 440 modules. The CPU 430 will propagate the signals via its I/O port 401 to the main CPU 535 of the main units 600 and 690 shown in FIGS. 7 and 8 respectively.

The main CPU 535 connects and routs the audio and video digital signals to the terminal 163 of the circuit 100. As the circuits 190 and 290 of FIGS. 3 and 4 are provided with one way only FSK and FM modulated video propagation, they cannot be used for bidirectional FSK signals such as needed for the inbound microphone signal and the outbound speaker signal. Yet for the modules 440 that are used solely for propagating one way FSK data for updating or upgrading the stored data in the memory 208 or the memory buffer 208A shown in FIGS. 11A and 11B, the circuits 190 and 290 can be used.

When the microphone signal and the speaker signals are analog and only the camera signal is digital the circuits 190 and 290 can be used. The programmed selector however will connect and rout the camera signal via the CPU 430 and via the CPU 535 to the terminal 163 and the selectors 104A and 104B will rout the signal to the FSK demodulate circuit to process, decode and store the picture data into the memory 208 shown in FIGS. 11A and 11B. If the stored video signal is compressed the CPU 205 will decompress the signal for display onto the shopping terminal screen 209.

When a visitor activates the entry panel 400 of FIG. 5A using touch screens, visitor select keys or any other type of accessing, such as RFID card, picture identification and similar the switch 420 will connect the speaker (sp.), the microphone (mic.) and video signal generated by the camera 403 of said entry panel.

Figure 12:
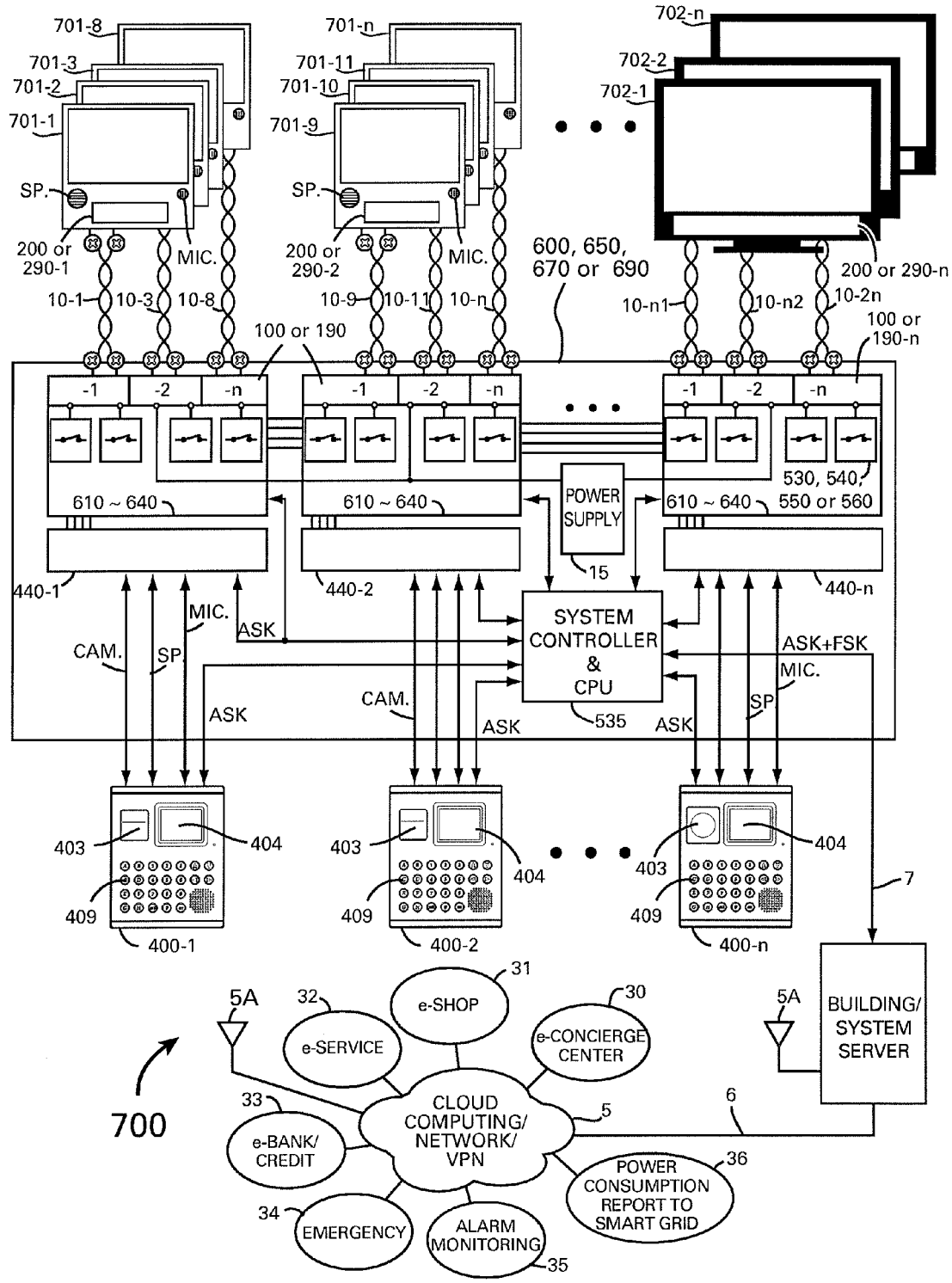
FIG. 12 is a block diagram showing the close circuit e-shopping system comprising video interphone system and television sets.

The video, mic., and speaker signals are fed through the terminal 405, 406 and 407 of the entry panel to the terminals 140, 141 and 161 of the circuit 100 or 190 respectively for communicating with the video interphone 701 or the shopping terminal that is shown to be combined with a television (TV) set 702 of FIG. 12. The entry panels shown in FIG. 12 are shown with select keys 409 and a display screen including a touch screen 404 and the camera 403.

The switch 420 shown in FIG. 5A thereby becomes a linking switch between the shown single entry panel and the circuit 190, feeding the inbound microphone and camera signals and receiving the outbound speaker signal for communicating via the line 10 and the circuit 290 with the video interphone 701 or the combined shopping terminal and a TV set 702 shown in FIG. 12. It is obviously clear that the CPU 430 of FIGS. 5A and 5B can be controlled by the main CPU 535 on the basis of a switch on command generated by the video interphone 701 or the shopping terminal 702 of FIG. 12.

FIG. 5B shows n entry panels 400-1, 400-2 and 400-n, each incorporating the switch 420. The CPUs 430 are programmed to switch on only one switch 420, be it by a command generated at random by a visitor at one of the entry panels, or by a command generated and fed from the video interphone monitor 701 or the TV set 702 and propagated via the CPU 535. The CPUs 430 will reject a switch on command to a switch 420 when another switch 420 is switched on. The limiting of the switches 420 operation to one switch only is important because the connections setup shown in FIG. 5B cannot permit the linking of more than one entry panel 400 with the circuit 100 or 190.

FIG. 6A shows an expanded switching circuit of FIG. 5B for connecting any one of the entry panels 400-1~400-n with a single circuit 190 such as circuit 190-1, or selectively any one of the panels 400 with any one of the n circuits 190, or connecting plurality of the entry panels 400 with plurality of the circuits 190. The circuit of FIG. 6A is showing two entry panels 400-2 and 400-n connected to the circuits 190-n and 190-1 respectively.

In details the entry panel 400-2 is connected to the circuit 190-n via the switch 533-2 of the combination switch 530-n shown in the block 620-n. The entry panel 400-n is connected to the circuit 190-1 via the switch 533-n of the combination switch 530-1 in the block 620-1. The switches 420-1~420-n are interconnected in a given pattern inside the blocks 620 for providing shortest possible linking lines within the PCB area.

The shown n combination switches 530-1 and 530-n each comprising n switches or routers 533-1, 533-2 and 533-n. The number of switches 533 of each combination switch 530 is selected to correspond with the number of the modules 440 including the entry panels 400 connected through the modules 440, shown to be n.

The main CPU 535 is programmed to switch on only one of the n switches 533 of a given combination switch 530 together with a selected one switch 420. For example, FIG. 6A shows an entry panel 400-2 commanded to link with the circuit 190-n via the switches 420-2 and 533-2 of the combination switch 530-n and the entry panel 400-n is commanded to link with the circuit 190-1 via the switches 420-n and 533-n of the combination switch 530-1 respectively.

The entry panels 400 of FIGS. 5B and 6A are shown diluted, without the drivers and/or the signals connection to the I/O ports 431~433 of FIG. 5A. The entry panels 400 in FIG. 6A are shown diluted for simplifying the drawings, but should be viewed as comprising the same blocks and circuits shown in FIG. 5A including other elements such as a display with touch screen 404 and select keys 409 shown in FIG. 12.

Further, it is important and significant that only one switch 533 or 544 of a given combination switch 530 or 540 shown in FIGS. 6A and 6B can be switched on and that no two switches 533 or 544 of a given combination switch 530 or 540 are linked with the same entry panel 400 or same module 440. Such limitation makes it obviously clear that any one of the circuits 190 can be linked with any one of the entry panels 400 directly, and that no other circuit 190 can be linked with the same entry panel.

The preferred embodiment program for the CPUs 205, 105, 430 and 535 prevents two or more circuits 100, 190, 200 and 290 from being crossed or linked together, be it with the same entry panel 400, or as will be explained later, with the same entry panel, or the same e-service and e-shopping interface module 440 shown also in FIGS. 7 and 8.

The programming of switches or routers used in a network such as an infrastructure of a building must consider seriously the best method to prevent hacking or abuse of commercial transactions. The commonly propagated TCP/IP signal in a network with routers and hubs such as Ethernet network is easily accessible through the many hubs or routers of such network and the preferred embodiment of the present invention is to provide physical routing for pier to pier communication only.

Typical IP routing via IP digital switches, such as used for example by the well known digital switches in a voice over IP (VoIP) systems is not the preferred embodiment, even though such digital switches can be programmed for pier to pier links.

Such IP switching ICs used in a commercial environment must be programmed with highly secured and limiting interconnection between the shopping terminal circuit 100 or 190 with the entry panel 400 or the module 440 shown in FIGS. 7~10. Yet it can never be safe enough to prevent hackers from within the building unless a very high level of security protections including encryption and other complex and costly programs are applied.

For this reason the preferred embodiment of the present invention uses switching or routing devices programmed to ensure each line 10 integrity and that no two lines 10 can be crossed or physically invaded and that the connections between residences or offices from within the building can never be misidentified or wrongly diagnosed as another registered user.

The programs designed for the switches or routers of an infrastructured network used for multi tenants building must include high level of security programming for preventing hacking and abuses, particularly when the infrastructure is used for commercial purposes such as e-shopping and e-services that may include bank transactions, credit cards and insurance services.

Such high level programming for residential buildings is extremely costly, particularly when the network is a local (LAN) IP network such as the well known Ethernet. Infrastructure based on commonly available hubs and routers used in Ethernet network can be easily penetrated from within the system as stated above.

A simple unplugging of an RJ45 connecter from a switching hub or a router of the building internal network and replacing it by an RJ45 plug linked to the hacker's PC provides a knowledgeable hacker the simple means to invade, or it may be viewed as invitation to enter and abuse the system from within. Therefore even highly secured IP LAN system that includes encryption and other well known firewalls will be rejected by most financial institution, that commonly refuse to be connected to a vulnerable network.

The referred to above communication of choice is one that enables the communication of data and commands and protocols to be propagated in inbound and outbound direction using ASK and FSK modulated signals as well as video and audio signals, all of which are preferably used to include directive commands and protocols, directing data or transactions at synchronized random timing via different routes, such as interrupting FSK stream for continuation by an ASK stream commanded via audio stream.

Such synchronous switching between communication mediums over a single twisted pair connected is star configuration between two circuits 100 and 200 that process the random synchronous directing commands for a pre-configured transactions, fully protect any attempt to invade the system via the internal communication lines of a building and which is another preferred embodiment of the programming used in the present invention.

It is preferable to have a system that prevents physical accesses to switches and/or to the twisted pair lines 10 from within the building. For example, the shown lines 10 between the circuits 100 and 200 are forming pier to pier star connections shown as direct connection between the main unit or matrix 600, 650, 670 or 690 of FIGS. 7~10 with each individual circuit 200 or 290 of each apartment or unit of a building.

Moreover, though the switches are shown in FIGS. 6A and 6B as a set of mechanical switches or combination of multi poles switches and individually numbered, such as 420, 533 or 544, the switches of the preferred embodiment of the present invention are combined into one or very few IC packages, such as the well known gate arrays (FPGA) and/or large scale multiplexers having multi-channel arrays, such as the arrays 530 and 540 having common command to switch on or link simultaneously the combination of signals referred to above, which applies also to the switches 420 of FIGS. 6A and 6B as well.

Figure 9:
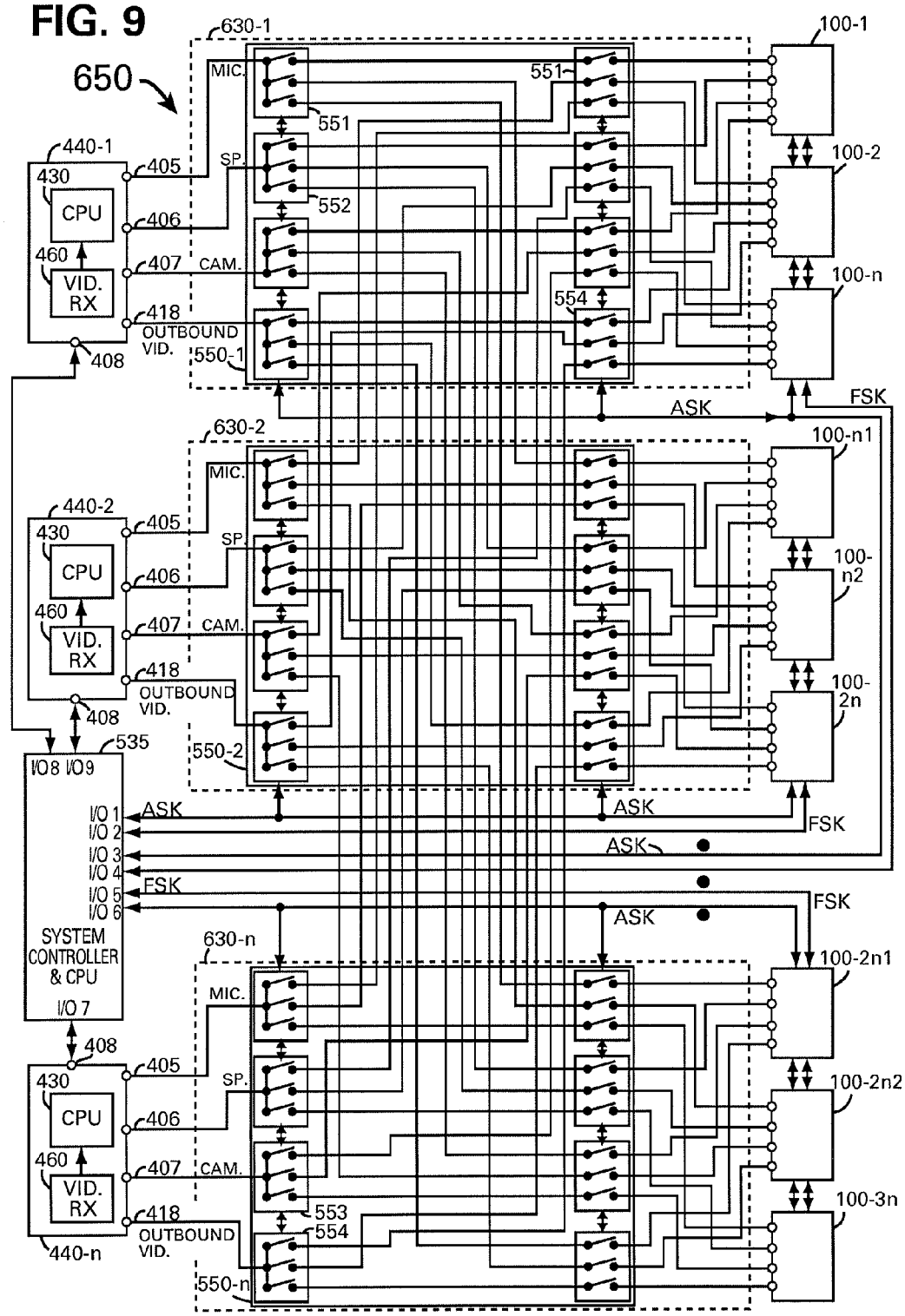
FIG. 9 is an electrical block diagram similar to FIG. 7 with a different switching or routing setup of another preferred embodiment.
Figure 10:
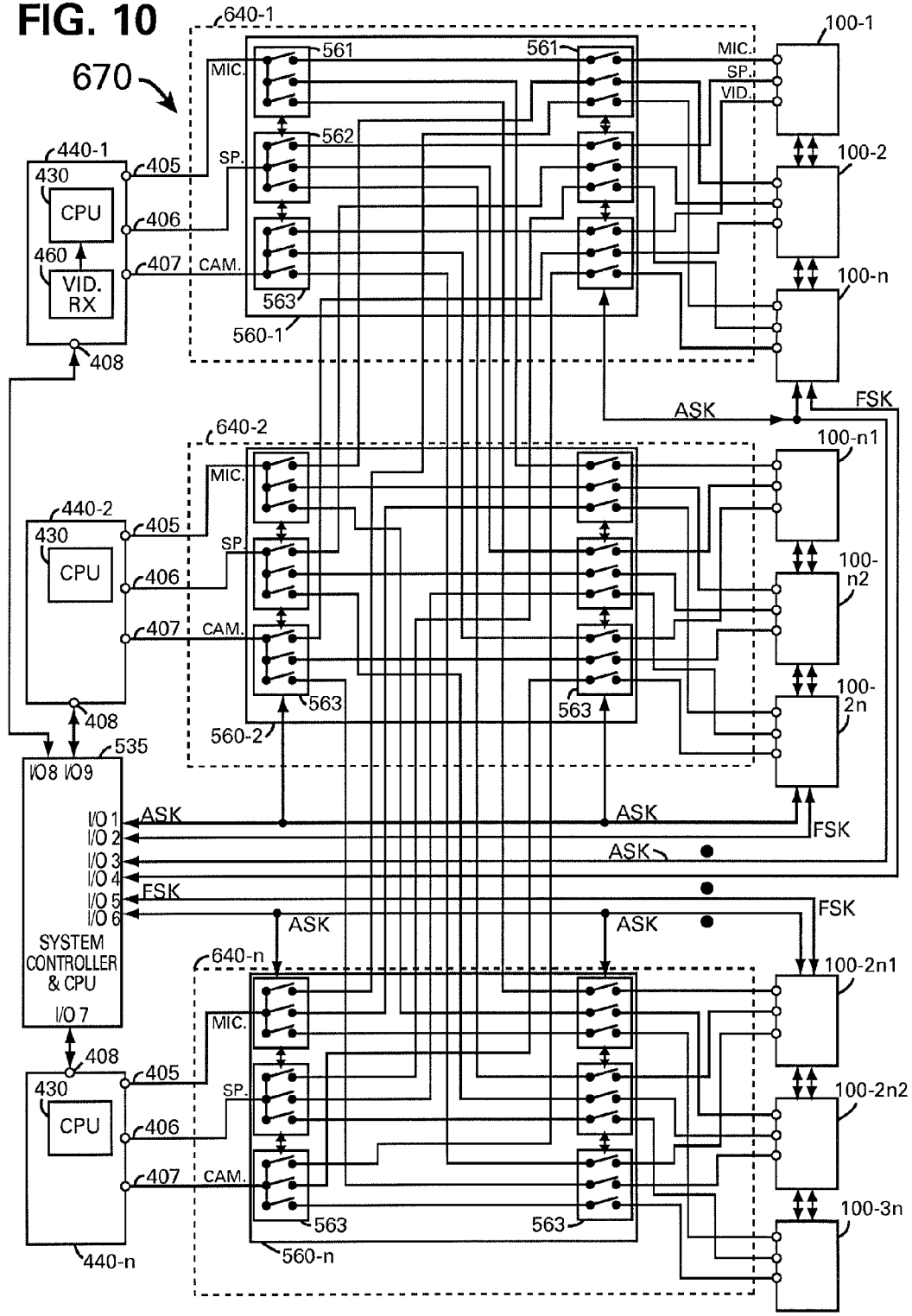
FIG. 10 is an electrical block diagram similar to FIG. 8 with a different switching or routing setup of another preferred embodiment.

The other shown switches having a common terminal and multi pole channels for commanding and linking each channel individually, such as the switches 551~554 and 561~563 of routers arrays 550 and 560 included in the blocks 630 and 640 of FIGS. 9 and 10, each connected to n plurality of the circuit 100 and 190 respectively.

When ASK and FSK IP signals including VoIP and IP video signals are propagated through the main unit 600, 650, 670 or 690 the switches of the preferred embodiment referred to above further comprising the well known digital switches, and the programs for the main unit or matrix 600, 650, 670 or 690 is preferably programmed to maintain the direct pier to pier connection via the fixedly connected single twisted pair 10 between the circuit 100 or 190 of the main unit and the circuit 200 or 290 of the video interphone 701 or the shopping terminal 702 shown in FIG. 12 in each apartment or a unit of a building.

FIGS. 6A, 6B and 7 show the main units 600 and 690, termed also a routing unit, a router or a matrix for connecting or linking the bidirectional video, FSK, ASK and audio signals including DC feed of controlled current via the fixedly attached n twisted pair lines 10 between n pairs of circuits 100 and 200 or 190 and 290, for selectively connecting n entry panels 400 or e-service or e-shopping interfacing modules 440 with n video interphone monitors or other display appliances including the shopping circuits 20 shown in FIGS. 11A~13.

The entry panel, e-service and e-shopping modules 440 are connecting modules comprising the switches 420 that are not shown in FIG. 7 but shown in FIGS. 6A and 6B including the CPU 430, for operating the basic entry panels 400, such as shown in FIG. 12, comprising the circuits shown in FIG. 5A but without the switch 420.

By such arrangement the switches 420 feeding the microphone, speaker and camera lines of the entry panels 400-1~400-n of FIG. 5B need not be remotely connected to distant terminals of the main unit 600, preferably they are positioned in close vicinity with the switches 533 or 544 of FIGS. 6A and 6B such as shown inside blocks 620-1~620-n of FIG. 6A and block 610-n of FIG. 6B. Each entry panel 400 is thereby connected directly to a given termination point within the main unit, with each line being properly terminated.

Proper termination will not be possible if the shown undefined length of the lines connected in FIG. 5B to the open switches 420, leaving the ends of the lines in a state of open tails that cause poor or bad termination with high standing waves ratio.

For such reasons and for simplifying the interconnections and the termination of the lines of the system it is preferred to provide all the connections 405, 406, 407 and 408 from the switch 420 into a central connection points leading to the four or three pole switches or routers 544 or 533 inside the blocks 610-1~610-n of the main unit 600 and 620-1~620-n of the main unit 690 of FIGS. 7 and 8 respectively.

Each switch 544 of the router array 540 is operated to link all the four signals via the four poles shown in FIG. 7 for linking the mic., sp., inbound video and outbound video for each of the n circuits 100. The three pole switches 533 of the router array 530 shown in FIG. 8 connect to the circuits 190 that do not provide outbound FM video and do not use the fourth pole. The switches 533 and 544 are concentrated into a small printed circuit board (PCB) area of the blocks 610 and 620 with very short interconnecting lines between them.

The switches 420 that are operated via the CPU 430 of the modules 440 and are preferably positioned in closed vicinity with the circuits 100 and 190 respectively. It is further preferable to combine all the switches into a small area, for exchanging the combinations of signals with n number of circuits 100 or 190 each comprising four pole switches or routers 544 shown in FIG. 7 or three pole switches or routers 533 shown in FIG. 8 for switching or routing the mic., sp. inbound video and outbound video signals, exchanged with the circuit 200.

Even though the main unit 600 is structured to connect the circuit 100 of FIG. 1A the shown circuit 190 of FIG. 3A can be introduced instead of the circuit 100. The difference between circuits 100 and 190 is that the circuit 190 is not provided with the outbound circuits for the FM video signal, nor the terminal 160. The fourth pole of the switch 544 that connects the outbound FM video via the terminal 160 of circuit 200 will therefore not propagate the outbound FM video signal when the circuit 190 is connected, but all other referred to above signals including mic., sp. and camera signals will be propagated promptly.

FIG. 8 shows the main unit 690 that is similar to the main unit 600 of FIG. 7. The difference is the use of three pole switches or routers 533 for each circuit 190 instead of the four pole switches or routers 544 used in the circuit 100. As the circuit 190 does not propagate outbound FM modulated video the outbound video terminal 160 and the outbound video selector 104 are not needed and are not included in the circuit 190.

Yet, if a shopping circuit 20 of FIG. 11A is provided with a digital video source the shopping circuit can generate and modulate the digital video signal for feeding an outbound FSK modulated digital video signal via the CPUs 205, 105 and through the I/O port of the CPU 535 of FIG. 11A.

The bidirectional ASK signals are propagated between the CPUs 105, 205, 535 and 430 at a preferred rate of 125K baud. The ASK signal is accessible via all the elements, units and devices of the system such as the video interphone monitor 701, the shopping terminal 702, the circuit 100, 190, 200 and 290, the entry panels 400, the interfacing modules 440, the main units 600, 650, 670 and 690, the system server 8 at random and at all times.

Both the main units 600 and 690 shown in FIGS. 7 and 8 clearly illustrate that any of the modules 440 can selectively propagate one way and bidirectional combinations of the signals referred to above, selectively via the switches or routers 420, 533 and 544 including the CPUs 205 and 105 for exchanging the ASK and FSK signals with any of a selected circuits 200 or 290 via the circuits 100 or 190, and via the single twisted pair 10 fixedly connecting the two circuits 100 with 200, or 190 with 290, including the feeding of a controlled DC current to said circuit 200 or 290 via the same twisted pair 10.

FIG. 9 shows another switching or routing setup via the selectors or switches or routers 551~554 of a combination router 550. The shown individual switches, selectors or routers 551~554 of the combination routers 550 differ from the shown switches 420 and the switches or routers 533 or 544 of the combination switch 530 or 540 by the number of poles per each switch or router, the number of the switches or routers used and by the applied control whereby all of the three or four poles of the switches or routers 420, 533 and 544 are operated simultaneously to link selectively a circuit 200 or 290 via the line 10 and the circuits 100 or 199 with a module 440 by operating a pair of switches or routers 420 and 533 or 420 and 544 shown in FIGS. 7 and 8 via a single command.

In contrast the routers shown in FIGS. 9 and 10 illustrate a different switching setup whereby, the switch or router 420 inside the module 440 (not shown in FIGS. 7~10) is operated selectively the same way as it does in FIGS. 7 and 8, by switching the three poles to link the three referred to above mic., sp. and inbound video or camera signals between a selected entry panel 400 via the combination switches or routers 530 or 540 of FIGS. 7 and 8 or via the combination routers 550 and 560 of FIGS. 9 and 10.

For the avoidance of a doubt the switches 420, 533, 544, 551~554 and 561~563 are shown as electrical contact switches for the purpose of simplifying the explanation, however the switching, routing or selecting devices 420, 533, 544, 551~554 and 561~563 can be mechanical contacts but are preferably semiconductor devices known as routers, selectors, multiplexers and other well known FET or other switching transistors or packaged ICs available from many semiconductor manufacturers at low cost.

The poles of the switches 420, 533 or 544 that are termed hereafter "multi routers", each comprising three or four poles that are operated simultaneously. The other switches that are termed hereafter "port selector" comprising the selectors 551~554 and 561~563 are fundamentally different. Each selector comprising a common port of a router with in-out (I/O) n ports, each port is individually controlled.

Both types the "multi routers" and the "port selector" are selectively operated to connect one of the modules 440 with one of the circuits 100 or 190. Each of the switches or routers 420, 533 and 544 are shown in FIGS. 7 and 8 to link a combination of signals comprising microphone, speaker, inbound video and outbound video between one of the circuits 100 or 190 and one of the modules 440, or between plurality of circuits 100 or 190 with plurality of modules 440.

The four pole switches 544 in FIG. 7 link the mic., sp., the inbound video and the outbound video with one of the modules 440, the three pole switches 533 of the main unit 690 of FIG. 8 do not link or propagate outbound FM video signal.

FIGS. 9 and 10 show the selective routing of the microphone, speaker, inbound video and the outbound video signals via the routers 551~554 and 561~563 comprising a common port and n I/O ports and termed "port selector". FIGS. 9 and 10 clearly show the difference between the routers 551~554 or 561~563 of the main units 650 and 670 and the switches 533 or 544 of the main units 600 and 690 shown in FIGS. 7 and 8.

The number of the "multi routers" 533 and 544 per each circuit 100 or 190 is equal to the number of the modules 440 embedded into or connected to the main units 600 and 690 of FIGS. 7 and 8, including the number of entry panels 400 connected to the main unit via the modules 440.

Only six "port selectors" 561~563 are used for the n circuits 190 of each block 640 and only eight "port selectors" 551~554 are used for the n circuits 100 of each block 630 of the main units 670 and 650 of FIGS. 9 and 10 respectively.

The use of the combination router arrays comprising only six or eight "port selectors" to link the n lines 10 of blocks 630 or 640 is made possible by the introduction of n I/O ports to each "port selector" equal to the number of the circuits 100 or 190 of each block 630 or 640 on one side and the number of the modules 440 connected to or embedded into the main unit 670 or 650 on the other side. The number of the modules 440 including the number of entry panel 400 connected to the main units 670 and 650 respectively via the modules 440.

Since the number of the modules and the circuits 100 and 190 are finite number such as, for example 16, or 32, there are no practical limitation to employ both types of "multi routers" or "port selectors". The selection of which is dependent on costs and on the basis of how many modules 440 and how many connecting lines 10 are needed for a given building infrastructure.

FIG. 11A shows the electrical block diagrams of the shopping terminal 20 connected via a single twisted pair 10 to the main unit 600, 650, 670 or 690 that is further connected via internal line 7 to a server 8 that is connected to a network 5 shown to be a Private Virtual Network (VPN) within the network 5.

The shopping terminal 20 comprising a display and a touch screen 209 operated by the control, communication and power circuit 21 comprising the CPU 205, a memory 208 termed "terminal memory" and the circuit 200 or 290. The circuit 21 further comprising a built-in or an optional rechargeable battery 230 or external power supply via terminals 231~232 for connecting any well known DC power supply or an AC adaptor for powering the shopping terminal.

The preferred embodiment includes the rechargeable battery 230, but any other power supply can be used instead for powering the operating mode only, the standby mode only or both the standby and the operating mode. Using external power supply eliminates the use of the battery 230 or of the entire power feed via the twisted pair 10 detailed above, including the power terminals and the power components such the coils 153, 154, 256, 257, the rectifier 255, the regulator 253, the charge circuit 231, the capacitors 152, 254, 252 and the terminals 150, 151, 232, 233, 250 and 251 of FIGS. 1A and 2A.

FIG. 11A also shows the main router or matrix unit that can be any of the main units 600, 650, 670 and 690 shown in FIGS. 7~10 comprising the CPU or the system controller 535, the switching or routing arrays 530, 540, 550 or 560 also shown in FIGS. 7~10, a memory 536 attached to the CPU 535, the n interfacing modules 440, the power supply 15 for feeding the VCC to the system and the controlled current via the terminals 150 and 151 and the n circuits 100 or 190.

The shown block diagram of the system components in FIG. 11A clearly identifies the simple structure of the shopping platform interconnected by a single twisted pair 10 per each shopping terminal 20 including the powering of at least the standby mode for enabling the updating of the shopping and services data regardless of the power switch status in a dwelling or an office or a business unit of a building.

FIG. 11A further shows the main unit connection to a server and to a network 5 selected from a group comprising a dedicated network, a private network, public networks, the internet, including wireless network extension 5A and combinations thereof. The wireless network extension is selected from a group comprising mobile, Bluetooth, WiFi and combinations thereof. The VPN shown inside the network cloud 5 is a Virtual Private Network program tailored for any of the networks 5 referred to above including the wireless networks 5A.

Figure 14:
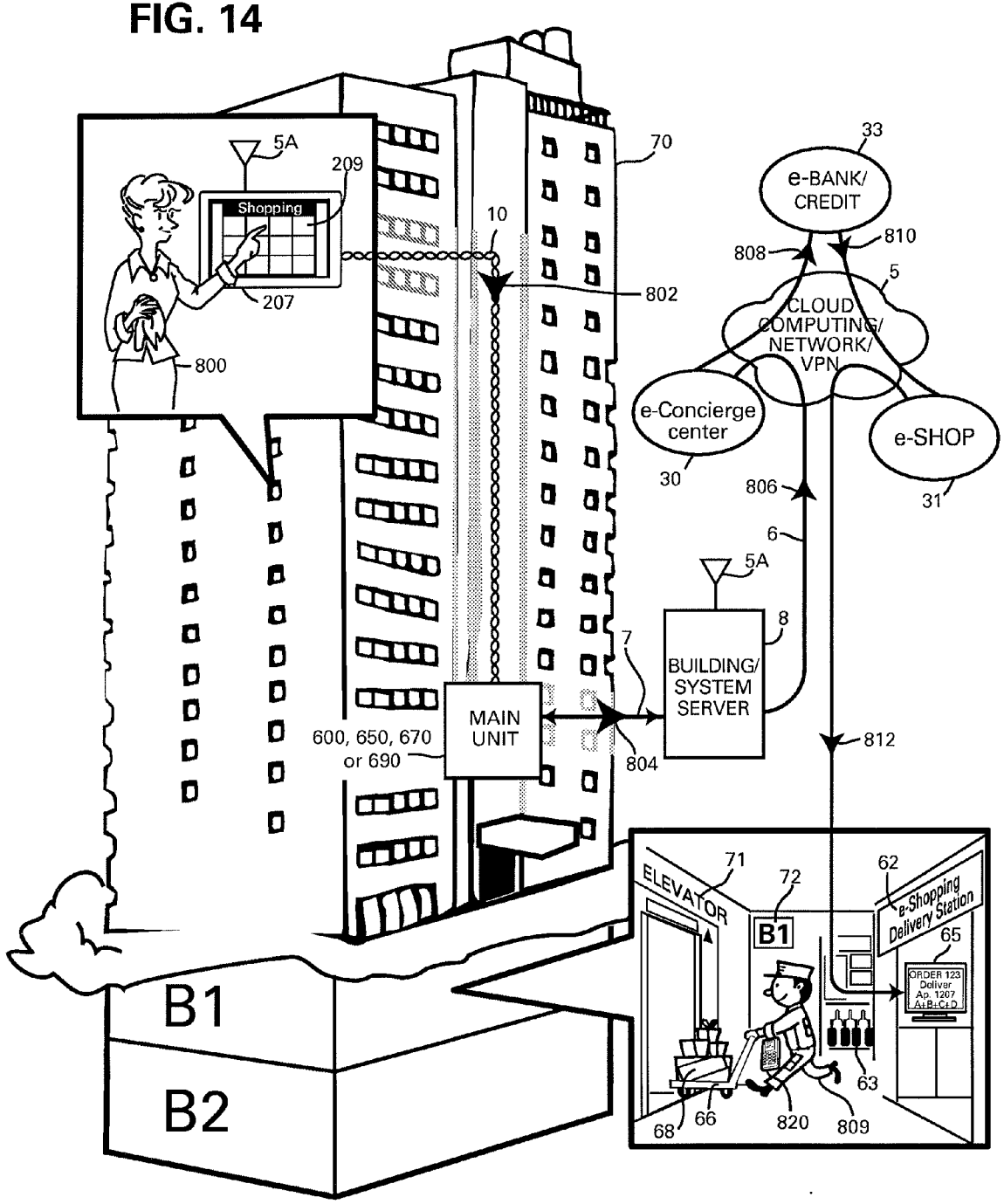
FIG. 14 is an illustration showing the closed circuit e-shopping of the preferred embodiment of the present invention including a block diagram of the system, the order processing in stages via the virtual private network of the system and the physical delivery from an embedded e-shopping delivery station to the ordering dweller.
Figure 15A:
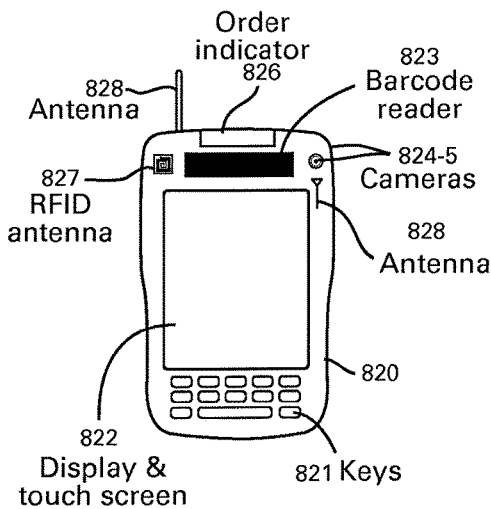
FIGS. 15A and 15B are illustrations of the delivery tablet and the smart cart of the preferred embodiment of the present invention.
Figure 15B:
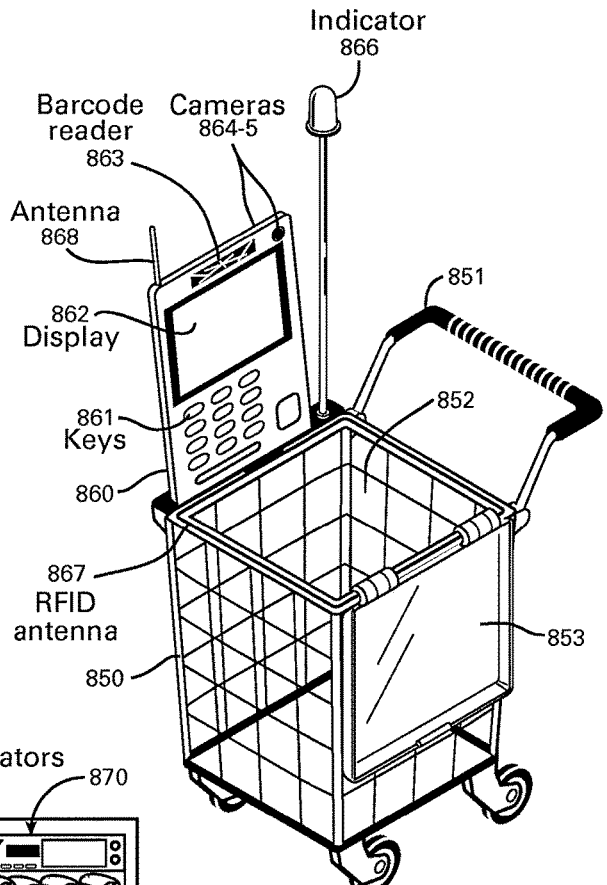

The antenna of the WiFi or mobile or Bluetooth network 5A is shown operated via the VAN cloud, but can be connected directly to the server 8 for communicating WiFi or Bluetooth signals, for example communicating with a handheld delivery table or a delivery device 820 carried by a deliveryman or service man, or it can be a delivery smart cart incorporating similar delivery unit 860 for acknowledging deliveries made to a dweller at his dwelling unit in a building or locally in the neighborhood shown in FIGS. 14 and 15B. Such RF delivery tablet or device is also disclosed in the U.S. application Ser. No. 13/599,275 (page 39, lines 3~12).

FIG. 11B shows the simplicity of loading, upgrading and updating the memory 208 termed hereafter "terminal memory" and the recall of the display pages for choosing the e-shopping and e-services via the shopping terminal 20. The shown recall of the display pages into a memory buffer 208A are detailed in the pending U.S. application Ser. No. 13/599, 275 referred to above.

It becomes clear that the use of the circuits 100, 190, 200 and 290 of FIGS. 1A~4B for providing high speed of up to 5.0 Mb FSK data via a single twisted pair 10 that feeds a controlled DC current calculated to charge a battery 230 and maintain standby power for the CPU 205 and the memory 208, for receiving and installing fresh loading, upgrading and/or updating the terminal memory at random or periodically as scheduled without disrupting the on-going communications.

It becomes further clear that a twisted pair cable length of over 200 m or 650 ft in a direct pier to pier connection substantially improve the security of the communications propagated via internal lines of a shopping infrastructure of a residential or office tower building or housing complex and yet provide the speed needed to update the shopping and services data to large residential complexes instantly at all times.

Moreover, the FSK data is augmented and supported by the high speed bidirectional ASK data for synchronously commanding the different circuit in concert with the operation of the system and the signals propagation. Providing distinct synchronized programs for updating data, shopping and operating command signals via a single twisted pair 10.

Even though it is advantageous to use the single twisted pair 10 for propagating all the referred to above signals including the constant current feed, it is similarly possible to use for the pier to pier connections a standard CAT5 cable comprising four twisted pairs, each propagating one or two of the signals such as one pair for bidirectional FSK, one pair for bidirectional ASK, one pair for audio and the FM modulated video and the fourth pair for feeding DC power, in which case the power does not need to be controlled current feed, instead it can be a regulated voltage feed.

The use of the high speed FSK data with carrier frequency of 10~20 MHz will enable to propagate the FSK signal for well over 200 m or 650 ft. The power feed can also be a power feed for powering the circuit 200 or 290 and for charging the rechargeable battery with trickle charge of, for example, 50 mA. Therefore for smaller residential buildings such as with 8 or 16 or 20 apartments where the lower installing cost advantages of the non-polar single twisted pair are not meaningful, it is possible to install standard CAT5 cable instead of the single twisted pair even though the pier to pier wiring will be far more complex to install.

It should be noted that the above references suggesting which twisted pair of the CAT5 can propagate which given signal or signals is a matter of choice and that the signal or signals are preferably propagated along with the DC power feed or without power feed via the four twisted pairs. Further, as a matter of choice the CAT5 cable can be used partially, such as using two pairs or three pairs instead of the one twisted pair, which is the preferred embodiment of the present invention.

Similarly the video signal propagation from an entry panel of a building or of an access control can be propagated and routed or switched via a coax cable and the audio can be propagated via shielded wires or cables. In such setup the audio transformers 142 and 242 of FIGS. 1 and 4 will not be necessary, and if video signals are propagated via the coax cable the FM modulator of the modulate/demodulate 102 the selector 104/204 will be replaced by video routers.

Similarly the shopping terminals circuits of the television receivers 702 of FIG. 12 and the different television boxes such as the set-top box 703 and e-shopping box 705 of FIG. 13 may be connected to a network of antenna cables or to a cable TV distribution via fiber optic cables, multi core cables and other special dedicated cables.

FIG. 12 shows a video interphone system 700 of a building comprising n entry panels 400, n video interphone monitors 701-1~701-n including the shopping circuit 20 of FIGS. 11A and 11B, television receivers 702-1~702-n including the shopping circuit 20 of FIGS. 11A and 11B and the well known video interphone circuits, similar to the circuits used for the video interphones 701. Each of the video interphone monitors 701 and of the television receiver 702 are connected via a single twisted pair 10 to the main router or matrix unit 600, 650, 670 or 690.

The main router or matrix unit further shown to be connected to a server 8 via the system CPU 535 and via an interconnecting line 7 including a network interfacing line 6 to a network 5.

The network 5 comprising a Virtual Private Network (VPN) connected to the shown service and merchandise providers selected from e-concierge center 30, e-shop or shops 31, e-service or services 32, e-bank or credit facility 33, emergency services 34, alarm monitoring and support 35 and power consumption reporting and control by a smart grid 36.

The shown service and merchandise as well as other referred to on-line providers and institutions are a token or a summary of the many and the variety of the e-shopping and e-services providers and facilities that can be introduced and connected via the network 5 and the system server 8 to the infrastructure of a building comprising the internal communication lines, using the circuits 100, 190, 200 and 290 described above.

Though not shown in the drawings, it is obviously clear that the server 8 can be linked to a computing cloud provider for storing and updating the providers programs, as tailored to each individual dweller or tenant of a building as further disclosed in the reference US patents and pending applications.

Further details covering the reference to power consumption reporting and control via a smart grid 36 are provided in the U.S. Pat. Nos. 7,639,907, 7,649,727, 7,864,500, 7,937,647, 8,041,221, 8,148,921, 8,170,722, 8,175,463, 8,269,376, 8,331,794, 8,331,795, 8,340,527, 8,344,668, 8,384,249, 8,441,824, 8,442,792 and U.S. patent application Ser. Nos. 13/349,939 and 13/599,275.

FIG. 13 shows a dedicated e-shopping infrastructure similar to the infrastructure shown in FIG. 12 without the entry panels 400 and the video interphone monitor 701. Instead the shopping circuit 20 and the circuit 200 or 290 are included in a set-top box 703 connecting the cable TV network 801 via the distributor 802 to the cable television 704.

The shopping circuit 20 is also included in a shopping box 705 that includes the circuit 200 or 290. The shopping box 705 connects a terrestrial television set 706 and to an antenna 803 via an antenna distributor 804. Also shown is a dedicated shopping terminal 707 that includes the circuit 200 or 290.

Each of the referred to above n circuits 200 or 290 is connected to the circuits 100 or 190 of the main unit 600, 650, 670 or 690 via a single twisted pair 10-10, 10-2 and 10-n via the terminals 10A, 10B, 11A and 11B referred and shown also in FIGS. 1A~B, 2A~B, 3A~B and 4A~B. The difference is the elimination of the entry panels and the mic., sp. and inbound video or camera signals shown or referred to in FIG. 12.

Yet even though the analog signals are not shown, as explained above, the mic., sp. and inbound camera signals can be propagated in a digital form by the bidirectional FSK signals via the system controller 535 and it is possible to enter the building via a well known access control system (not shown) and communicate from the apartments or offices with the access control via the mic. 711 shown included in the set-top box 703, the e-shopping box 705 and the dedicated shopping terminal 707.

The speaker (not shown but is included) in the CATV 704, the terrestrial TV 706 and a speaker 712 that is shown in the dedicated shopping terminal 707. The digital camera for generating digital video signal is not shown, but it is a well known camera used with access control of a building.

By such arrangement the system shown in FIG. 13 will have all the function of the system shown in FIG. 12 and moreover, it expands the range of the display and communication devices that can provide the e-shopping of the present invention to include the many different set-top boxes and/or converter boxes, including antenna and cable TV boxes and literally any type of TV set, or any type of shopping box such as the shown box 705.

The system server 8 connects to the system controller 535 via line and to the network via the line 6, the same way as shown in FIGS. 11 and 12 and further includes the wireless antenna 5A for communicating with wired and wireless network such as WiFi, Bluetooth and/or mobile, particularly with delivery personnel, operating from an embedded delivery warehouse within the building or the complex.

An embedded delivery station within a building or within a neighborhood provides a clear unambiguous solution to the persisting problems and difficulties affecting the grocery and fresh or cooked food e-shopping. The many attempts by large supermarket to create a more efficient delivery method and system particularly for fresh food, and other groceries did not succeed, as the fast delivery within short time, for example within 30 minutes, is completely out of reach.

The solution for such fast deliveries via an embedded e-shopping delivery station or warehouse is recited in the U.S. application Ser. No. 13/599,275 in page 39, lines 3~12. Yet a delivery station embedded into a building basement, or into an apartment of a building by itself, cannot provide fast deliveries, unless the entire concept of e-shopping is modified to enable a fast and simple processing and logistics, leading to a fast delivery from within the building, or complex, or the neighborhood.

FIG. 14 shows the infrastructure within a building 70 with a dweller 800 completing the order on the basis of an updated program stored into the terminal memory 208 via the recalled display pages 46~49 and the memory buffer 208A shown in FIG. 11B onto the display, operate and touch screen 209 of a shopping terminal circuit 20 shown also as a dedicated shopping terminal 207 in FIG. 13.

During the choosing process and all the way through the completion of the order the shopping terminal is operated in a shopping mode and it is not communicating on line. The shopping and ordering are completed on the basis of the updated program and content stored in the terminal memory 208 of the shopping terminal itself.

The updating is a continuous, random and/or a scheduled stream for keeping the products, their prices, availability and delivery particulars updated at all times. Therefore, the choosing and the ordering process is based on actual available products at the stated prices and in stock for delivery as provided by the updated data.

With the choosing of products, delivery, billing particulars and payment completed, the dweller 800 sends the completed order, shown as sent order 802 via the line 10 to the main unit 600, 650, 670 or 690. The CPU 535 of the main unit shown in FIGS. 12 and 13 processes the order and feed an interfaced signals 804 detailing said order via the interfacing module 440 and line 7 to the system server 8. The system server propagates data pertaining the received order 806 with the data being adapted or interfaced to the given network 5 protocols via line 6 and via the network 5 shown as VPN, to the e-concierge center 30.

The e-concierge center 30 is the entity registering, operating and controlling the closed circuit e-shopping and e-services of the present invention and all the transactions such as 808 within the VPN are recorded and validated by the e-concierge center 30. With the order validated it is forwarded to the e Bank and Credit 33 for payment processing.

As the e-shopping of the present invention is operating in a closed circuit in a Virtual Private Network, all the dwellers and providers are all registered clients and suppliers, by the e-concierge center 30, including all the financial institutions such as banks, credit cards, billing and credit facilities. By such arrangement the dwellers need not identify themselves as their location, the supply shops or the delivery stations are all registered and recorded. This setup makes the payment transaction simple and the e/Bank/Credit 33 validates the payment and directs the validated order and payment 810 to the e-shop 31.

Further, the shown system server 8 can be located inside or within the building 70 of FIG. 14, but it can be a server incorporated in the well known cloud computing services along with the servers of the other entities participating in the e-shopping program, such that the transaction moving in stages, will all move within the super speed of the cloud computing of today and of the future, to complete the order processing and payment in a fraction of a second.

With the payment validated, the original order 802 is now propagated, shown as 812, to the e-shopping delivery station 62 located in the basement B1 72 of the building 70 from the e-shop server 31. This prompts the deliveryman to load the cart 66 with the ordered groceries 68 and proceed to the elevator 71 to deliver promptly the ordered goods to the dweller 800 at hers or his apartment inside the building.

To complete the cycle, the dweller keys a pre-assigned code into a wireless delivery tablet 820, communicating via WiFi, or Bluetooth antenna 5A of the server 8 or via the shown antenna 5A of the shopping terminal through which the order was originated.

This closes the order and the payment by the e-Bank 32 crediting the e-shop 31 and debiting the dweller 800. The e-shop will automatically adjust the stock count and/or instruct a central warehouse to replace the sold goods during the next planned delivery to the delivery station 62 of the building 70, or as the case may be order an immediate delivery, because for example, the sold goods depleted the entire stock or reduced the stock to below a minimum level as set.

The referenced above to the deliveryman loading the cart 66 with the ordered groceries 68 may not be free from difficulties. For example the deliveryman 809 may pick up a pack of lemons instead of a pack of oranges and the error is discovered while delivering the groceries to the dweller 800. Such error causes substantial irritation, waste of time and delays, because the deliveryman must return to the delivery station, replace the packs and re-deliver the correct merchandise, which is time consuming, causes delay throughout and is costly. To avoid such errors the pick-up and delivery logistics must be made accurate, efficient with error prevention.

Another item of importance is the receiving of the order by the deliveryman. A paper print out of a received order or several orders mandate a physical handling of papers that may be miss-noticed, mishandled and/or violation of the sequence principle of first order received is the first to be processed.

For this reason, and as will be explained later, small delivery stations can operate with orders received directly through the wireless delivery tablet 820 shown in FIGS. 14 and 15A, but larger delivery stations preferably use an automated smart carts 850 shown in FIG. 15B.

The functions and features of both the delivery tablet 820 and the smart cart 850 can be similar or same, wherein the delivery tablet 820 comprising a CPU and a memory (not shown), a display and operate screen 822, operating keys 821, and selectable modules comprising barcode reader 823, front and rear cameras 824/825, RFID reader and antenna 827, RF transceiver and antenna 828 and order/delivery status indicator 826. The comparable items of the smart cart 850 are a CPU and a memory (not shown), the display and operate screen 862, operating keys 861 and the modules comprising barcode reader 863, front and rear cameras 864/865, RFID reader and antenna 867, RF transceiver and antenna 868 and order/delivery status indicator 866.

The procedure and logistics involved include the receiving of the order via the RF transceiver and antenna, be it WiFi, Bluetooth or other wireless RF signals and frequencies, with the order details displayed on the screen 822 or 862, and the status indicator 826 or 866 indicates, by the color of the status indicator or by such as flashing LEDs, that order is received and awaiting pick-up and delivery.

The deliveryman 809 picks up the delivery tablet 820 or the smart cart 860. For merchandise identified by barcode the deliveryman scans each item removed from its storage be it from shelf, bin or rack shown in FIG. 15C, or from a refrigerator (not shown) and scan the product via the barcode reader 823 or 863 before placing it into the smart cart 850 or into non-intelligent cart 66 of FIG. 14 or basket. For items identified by RFID tag the products can be scanned by the RFID reader antenna 827 of the delivery tablet 820, or automatically by simply placing the picked up item into the cart storing space 852.

The RFID antenna 867 surrounds the upper rim of the smart cart 850 and will automatically detect the passing RFID tag of the product placed into the cart. Every time the barcode scanner or the RFID reader identify the product as one of the ordered merchandise, the picked-up product displayed on the screen 822 and 862 will change its status and indication from "on order" to "picked up".

An attempt to pick up and scan or place a non-ordered product will be rejected with a warning indication that a wrong product is being picked up and should not be placed in the cart or delivered. With the picked up products or merchandise completed for a given order, the indicator will change its indication, such as its color to indicate waiting for delivery status, prompting the deliveryman to proceed and deliver the ordered products to the dweller.

Once the physical delivery take place each item is scanned for removal confirmation from the smart cart 850 or from the non-intelligent cart shown as 66 in FIG. 14 by the delivery tablet 820 and each item in the listed order on display will indicate product or merchandise removed. With all the items on order are delivered the dweller 800 of FIG. 14 will be keying a delivery completed pre-assigned code for delivery completed and the order will be closed, payment will be processed and the e-provider stock will be adjusted as referred to above.

The cameras 824/825 and 864/865 are introduced for taking pictures and recording the receiving dweller for creating a temporary files containing proof of the recipient at the time of delivery.

Another important item is the handling of simultaneously received delivery orders, be it small or large delivery station, each such station is preferably provided with plurality of delivery tablets 820 and/or smart carts 850 all programmed to operate in a sequence commensurate with the first order received is first to be processed (First in First out). If more than one deliveryman is in the station, the orders in the sequence received will be processed simultaneously. Attempt to process an order in violation of the receiving sequence as programmed cannot be processed and an indication of error will sound and/or displayed.

It should be noted that the smart cart 850 is shown in a square shape, which is a fit shape for moving merchandise inside elevators. The folding table 853, the handle 851 and the delivery unit 860 are illustrated not to size and/or precise shape, but simply to provide an image of the smart cart 850.

The last important item is the power source for the smart cart 850 and for the delivery tablet 820. The preferred embodiment uses a rechargeable batteries (not shown) that are being charged continuously whenever the smart cart 850 or the delivery tablet 820 are not in use and are attached or plugged to assigned chargers (not shown) for the carts in their parking place and to the delivery tablet onto a stand (not shown).

Figure 15C:
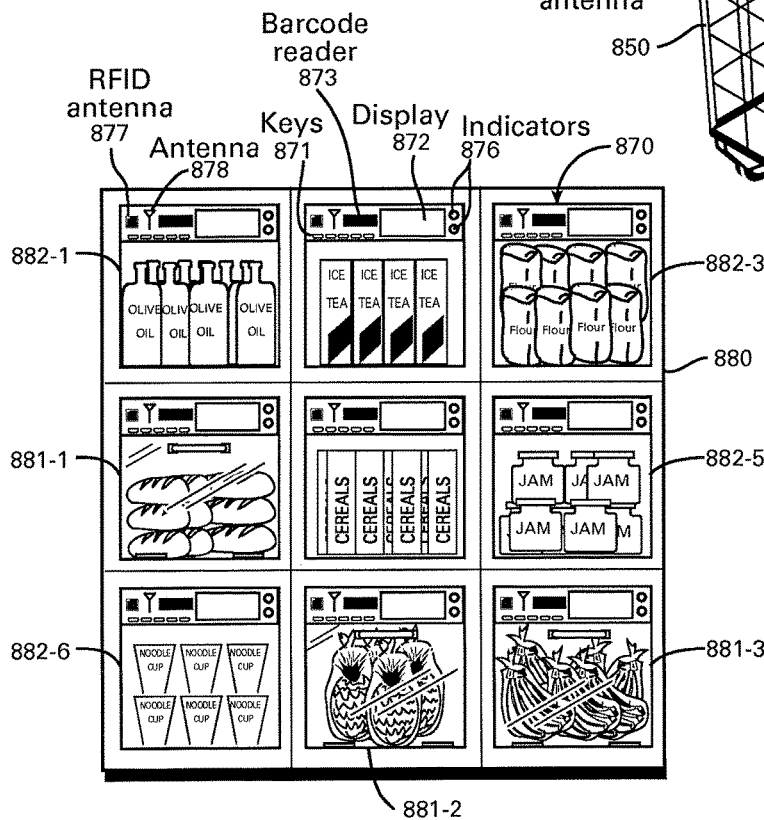
FIG. 15C is an illustration of smart storage bins or racks of a delivery station of the preferred embodiment of the present invention.

FIG. 15C shows an illustrated automated rack 880 for storing groceries as an example of merchandise. Not all the bins shown are identical, for example the bread bin 881-1 is covered by a front glass. Similar covers are provided for the bins 881-2 and 881-3 containing fruits.

Other bins 882-1~882-6 contain solid packages such as bottles, cans, jars or carton boxes and do not require cover protection.

Each of the bins however includes an hanging or attached tablet 870 for identifying the product, the stock figure and order in progress comprising display 872 enhanced by group of indicators 876 for identifying the orders in process, the ordering dweller and other particulars, such as quantity, price and time of delivery when the deliveryman is not nearby the rack, as an example.

Each bin is further provided by said tablet (storage device) 870 with barcode reader 873, RFID reader 877 and RF transceiver and antenna 878 for communicating with the delivery station server 65 of FIG. 14 and/or with the delivery tablet 820, delivery unit 860, or with the delivery station server 65 of FIG. 14.

The built-in or attached by hanging or otherwise attached tablet 870 (storage device) further comprising a CPU and a memory (not shown), operating keys and/or touch screen for transacting fresh stocks, returned merchandise, remove, enter, adjust stock levels and any other operating mode needed to handle the stock in the bins, shelves, pallets, stands, carts, basket, containers or other storage such as refrigerated, freeze, cool or heat bins and/or heaters for cooked food and similar.

With the support of the smart shelves or the automated racks 880, or bins, or cabinets and other smart storage facilities, including the delivery tablets 820 and the delivery unit 860 all communicating with each other and with the server 65 of the delivery station and with the shopping terminals at the ordering dweller site, the delivery process is substantially upgraded with error prevention, efficiency and to be delivered on time.

The shown closed circuit e-commerce entity of the VPN network 5 in FIG. 14 comprises the building server 8, the e-concierge center 30 which is the server controlling the closed circuit e-commerce entity, the e-bank and credit 33 and the e-shop 31. The closed circuit e-commerce of FIG. 14 represents a smaller closed circuit e-shopping entity than the shown entity of FIGS. 12 and 13. It is obvious that the other providers including services 32, shops 31, financial 30, emergency 34 and/or the power consumption reporting 36 and/or many other service and merchandise providers could be added to enlarge the closed circuit e-commerce into many fields of commerce, life style and support.

On the other hand, not all systems need to be large and cover every aspect of services and merchandise. Some system may be designed and created for a specific e-commerce activity. For example a grocery or pharmacy or office supply provider may operate a single warehouse unit for a large residential or office building via one or two delivery stations for prompt deliveries within a building or a neighborhood. Such provider management can manage the specific closed circuit e-commerce and replace the shown e-concierge center 30.

Accordingly for specific e-commerce activity, such as grocery, the e-concierge center may not be needed and is not used. Similarly, the network 5 can be a dedicated network 5 instead of the VPN shown in FIG. 14. Moreover for such specific or limited operation the provider can handle management, credit and payment and may not need the bank/credit provider 33 which will not be included in the closed circuit e-commerce entity.

This leaves only two servers 8 and 31 operating via a dedicated or private network 5 that forms a specific e-commerce entity, that though is small or limited in selection, it can effectively and efficiently operate with the circuits and processes disclosed above.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

What is claimed is:

1. A delivery station comprising:
   a station server including RF transceiving circuits;
   a plurality of smart storage facilities, wherein each smart storage facility of said plurality includes a built-in or attached storage device;
   wherein the included storage device is controlled by a storage CPU and a storage memory, operated by at least one of keys and touch icon of a storage display screen;
   wherein the each smart storage facility is provided with at least one first code reader and a first RF transceiver;
   at least one smart delivery device is controlled by a delivery CPU and a delivery memory, operated by at least one of keys and touch icon of a delivery display screen and including at least one second code reader and a second RF transceiver;
   wherein said station server is communicating with at least one provider server via at least one network and via the RF transceiving circuits with said first and second RF transceivers for loading and communicating updated data and particulars of stock level of each item stored in each said smart storage facility between said station server and said provider server and between said station server and each said smart storage facility and said smart delivery device;
   wherein said first and second RF transceivers further communicate with each other and with the station server, updates data and particulars of on-going transactions including fresh stock entry, return and remove of each given item stored in each given smart storage facility for recording the updated data and particulars in each said storage memory and in said delivery memory;
   wherein said updated data and particulars are further propagated at all times from said server of at least one provider to and via a server of a first building to a memory of at least one apartment terminal of said first building associated with said delivery station, for providing said apartment terminal an accurate updated statuses and particulars at all times for generating and propagating accurate delivery particulars for at least one item stored and available in said delivery station; and
   wherein at least one of a plurality of indicators and the display screens included in each of said storage devices, at least one of a plurality LEDs included in an indicator of said smart delivery device, the storage display screen, and the delivery display screen indicate and display a receiving of delivery particulars signals from said apartment terminal to be available for gathering and delivery.

2. The delivery station according to claim 1, wherein said delivery station is structured in a space within one of said first building and distant, and wherein the space within said first building is selected from a group comprising a basement, an entrance, a lobby, a given floor, a room, an apartment, a corridor, a mezzanine, a balcony, a roof and combinations thereof;
   wherein said plurality of smart storage facilities are selected from a group comprising racks, shelves, bins, cabinets, pallets, stands, containers, refrigerators, freezers, warmers, coolers and combinations thereof, wherein said smart delivery device is selected from a group comprising a delivery tablet, a smart cart, a smart cart with surrounding RFID antenna for automatic identifying the gathered item and a combination of said delivery tablet with at least one of a basket and a cart;
wherein said space within said distant is at least one of said space within a second building and a space outside said first building selected from a group comprising within a given neighborhood, within a given ward, within a given district, within a given town, within a given city, within a state, outside the state, within a country, outside the country and combinations thereof; and
wherein said delivery station is constructed into premises selected from a group comprising a store, a warehouse, a workshop, a club, an office, a box office, food catering depot, a depot, a plant, a clinic, an hospital, a gym, a campus, a library and combinations thereof.

3. The delivery station according to claim 1, wherein said station server is at least one of a stand-alone and a cloud computing, communicating with said e-provider server via said network selected from a group comprising a private network, a dedicated network, a public network, the internet, a Virtual Private Network (VPN) and combinations thereof;
wherein the station server communicates with the at least one provider server by propagating signals selected from a group comprising electrical signals, RF signals, optical signals and combinations thereof; and
wherein the signals propagated between said station server and each said smart storage facility including the storage device, said station server and said smart delivery device and between said smart delivery device and said smart storage facility are selected from a group comprising electrical signals, RF signals, RFID signals, optical signals and combinations thereof.

4. The delivery station according to claim 1, wherein said smart storage facility including said storage device are structured into a smart bin of an automated rack.

5. The delivery station according to claim 1, wherein said apartment terminal generating said delivery particulars signals is selected from a group comprising a video interphone monitor, a television receiver, a cable television receiver, a terrestrial television receiver, a set-top box, a cable television box, a television converter box, a dedicated box, a dedicated terminal and combinations thereof; and
wherein said apartment terminal propagates said delivery particulars signals via said server of first building and via at least one of a central entity server and a payment provider server.

6. The delivery station according to claim 1, wherein at least one of said particulars comprising at least one of the stored item description and packages containing the stored item selected from a group comprising dimensions, volume, weight, quantity, package variation, multi packages, package structure, package size, package volume, package weight, color, single item price, multi items price, single package price, multi packages price, reference dates, expiry date and combination thereof; and
wherein said statuses pertaining to said stored item are selected from a group comprising minimum quantity, max quantity, current stock, stock alert, out of stock, quantity limit per delivery, replenish schedule, next replenish time and date, at least one of present price and expiration, at least one of present promotion and expiration, at least one of present quantity discount and expiration, stable item, seasonal item, stable price, seasonable price, short time item, short time promotion and combinations thereof.

7. The delivery station according to claim 1, wherein said delivery station stores one of similar and distinct items provided by at least two distinct providers, wherein said station server is communicating with at least two provider servers via said at least one network including statuses, updates and delivery particulars signals identified to be for items provided by the two providers, and
wherein said apartment terminal generate said delivery particulars signals for the items provided by at least two distinct providers in a single propagation via said first building server.

8. The delivery station according to claim 1, wherein a payment for said delivery is executed by a payment provider selected from a group comprising a credit provider, a credit card provider, a bank provider, a financing provider, a clearing provider and combinations thereof upon receiving an acknowledgment for the delivery via one of said apartment terminal and said smart delivery device.

9. The delivery station according to claim 1, wherein said smart delivery device further comprising a camera for taking a picture of a dweller of a given apartment acknowledging said delivery for record keeping in one of a memory of said station server and said server of first building.

10. The delivery station according to claim 1, wherein said indicators and display screen further indicate and display delivery statuses by a given storage device selected from a group comprising the stored given item, delivery particulars signals received, quantity in said particulars signals, the signals propagating apartment particulars, pickup status, regular delivery, urgent delivery, given delivery time and combinations thereof; and
wherein at least one of said and indicators of a specific storage device identify the specific smart storage facility to be storing an item included in the received delivery particulars for directing the removing of the specific item identified by at least one of an RFID and a barcode reader of said specific storage facility, indicate the recording of the removal and the adjusted stock, and further indicate the receiving of communicated gathering signal confirming the gathering of the removed specific item into and identified by at least one of an RFID and a barcode reader of said smart delivery device.

11. The delivery station according to claim 1, wherein a data pertaining a removed item remains data in transition awaiting said one of receiving delivery acknowledgement and a return (cancelation).

12. A method for accurate delivering of items stored in a delivery station, said delivery station comprising:
a station server including RF transceiving circuits;
a plurality of smart storage facilities, wherein each storage facility of said plurality includes a built-in or attached storage device;
wherein the included storage device is controlled by a storage CPU and a storage memory operated by at least one of keys and a touch icons of storage display screen;
wherein the each smart storage facility is provided with at least one first code reader and a first RF transceiver; and
at least one smart delivery device including at least one second code reader and a second RF transceiver;
wherein said station server is linked via at least one network to at least one provider server and via the RF transceiving circuits with said first and second RF transceivers, the method comprising;
a. loading statuses and particulars of stock levels of each item stored in each said smart storage facility to said station server, to said server of at least one provider and to a storage and delivery memories included in each storage device and in the at least one smart delivery device respectively;

b. communicating on-going transactions at all times including fresh stock entry, enter and remove for updating the stock level of at least one of a given item stored in a given smart storage facility and the stock levels of all items stored in said plurality of smart storage facilities for further updating said particulars to said station sever and at least one provider server for introducing updated accurate data base for the delivery particulars and availability at all times;

c. propagating at all times from the server of said provider via said at least one network said updated data and particulars to at least one server of a first building associated with said delivery station for updating a memory of at least one apartment terminal of said first building for enabling the apartment terminal to generate and propagate only updated delivery particulars signals for items stored and available for delivery by said delivery station; and d. indicating and displaying by at least one of a plurality of indicators included in each of said storage devices, and at least one of a plurality of LEDs of an indicator included in said smart delivery device, and display screens included in each of said storage devices and said smart delivery device the receiving of the delivery particulars signals from said apartment terminal to be available for gathering and delivery.

13. The method according to claim 12, wherein said delivery station is structured in a space within one of said first building and distant, and wherein the space within said first building is selected from a group comprising a basement, an entrance, a lobby, a given floor, a room, an apartment, a corridor, a mezzanine, a balcony, a roof and combinations thereof;

wherein said plurality of smart storage facilities are selected from a group comprising racks, shelves, bins, cabinets, pallets, stands, containers, refrigerators, freezers, warmers, coolers and combinations thereof, wherein said smart delivery device is selected from a group comprising a delivery tablet, a smart cart, a smart cart with surrounding RFID antenna for automatic identifying the gathered item and a combination of said delivery tablet with at least one of a basket and a cart;

wherein said space within said distant is at least one of said space within a second building and areas outside said first building selected from a group comprising within a given neighborhood, within a given ward, within a given district, within a given town, within a given city, within a state, outside the state, within a country, outside the country and combinations thereof; and wherein said delivery station is constructed into premises selected from a group comprising a store, a warehouse, a workshop, a club, an office, a box office, food catering depot, a depot, a plant, a clinic, an hospital, a gym, a campus, a library and combinations thereof.

14. The method according to claim 12, wherein said station server is at least one of a stand-alone and a cloud computing, communicating with said one provider server via said network selected from a group comprising a private network, a dedicated network, a public network, the internet, a Virtual Private Network (VPN) and combinations thereof;

wherein the station server communicates with the at least one provider server by propagating signals selected from a group comprising electrical signals, RF signals, optical signals and combinations thereof; and wherein the signals propagated between said station server and each said smart storage facility including the storage device, said station server and said smart delivery device and between said smart delivery device and said smart storage facility are selected from a group comprising electrical signals, RF signals, RFID signals, optical signals and combinations thereof.

15. The method according to claim 12, wherein said smart storage facility including said storage device are structured into a smart bin of an automated rack.

16. The method according to claim 12, wherein said apartment terminal generating said delivery particulars signals is selected from a group comprising a video interphone monitor, a television receiver, a cable television receiver, a terrestrial television receiver, a set-top box, a cable television box, a television converter box, a dedicated box, a dedicated terminal and combinations thereof; and wherein said apartment terminal propagates said delivery particulars signals via said server of first building and via at least one of a central entity server and a payment provider server.

17. The method according to claim 12, wherein said particulars comprising at least one of the stored item description and packages containing the stored item selected from a group comprising dimensions, volume, weight, quantity, package variation, multi packages, package structure, package size, package volume, package weight, color, single item price, multi items price, single package price, multi packages price, reference dates, expiry date and combination thereof; and wherein said statuses pertaining to said stored item are selected from a group comprising minimum quantity, max quantity, current stock, stock alert, out of stock, quantity limit per delivery, replenish schedule, next replenish time and date, at least one of present price and expiration, at least one of present promotion and expiration, at least one of present quantity discount and expiration, stable item, seasonal item, stable price, seasonable price, short time item, short time promotion and combinations thereof.

18. The method according to claim 12, wherein said delivery station stores one of similar and distinct items provided by at least two distinct providers, wherein said station server is communicating with at least two provider servers via said at least one network including statuses, updates and delivery particulars signals identified to be for items provided by the two providers, and wherein said apartment terminal generate said delivery particulars signals for the items provided by at least two distinct providers in a single propagation via said first building server.

19. The method according to claim 12, wherein a payment for said delivery is executed by a payment provider selected from a group comprising a credit provider, a credit card provider, a bank provider, a financing provider, a clearing provider and combinations thereof upon receiving an acknowledgment for the delivery via one of said apartment terminal and said smart delivery device.

20. The method according to claim 12, wherein said smart delivery device further comprising a camera for taking a picture of a dweller of a given apartment acknowledging said delivery for record keeping in one of a memory of said station server and said server of said first building.

21. The method according to claim 12, wherein said indicators and display screen further indicate and display delivery statuses by a given storage device selected from a group comprising said stored given item, delivery particulars signals received, quantity in said particulars signals, the signals propagating apartment particulars, pickup status, regular delivery, urgent delivery, given delivery time and combinations thereof; and wherein at least one of said indicators of a specific storage device identify the specific smart storage facility to be storing an item included in the received delivery particulars for directing the removing of the specific item identified by at least one of an RFID and a barcode reader of said specific storage facility, indicate the recording of the removal and the adjusted stock, and further indicating the receiving of communicated gathering signal confirming the gathering of the removed specific item into and identified by at least one of an RFID and a barcode reader of said smart delivery device.

22. The method according to claim 12, wherein a data pertaining to a removed item remains data in transition awaiting said one of receiving delivery acknowledgement and a return (cancelation).

* * * * *